(12) United States Patent
Dunn

(10) Patent No.: US 12,059,089 B1
(45) Date of Patent: Aug. 13, 2024

(54) DRONE LANDING PAD SYSTEM AND RELATED METHODS

(71) Applicant: Brian Dunn, Scottsdale, AZ (US)

(72) Inventor: Brian Dunn, Scottsdale, AZ (US)

(73) Assignee: Brian Dunn, Scottsdale, AZ (US)

( * ) Notice: Subject to any disclaimer, the term of this patent is extended or adjusted under 35 U.S.C. 154(b) by 66 days.

(21) Appl. No.: 17/643,694

(22) Filed: Dec. 10, 2021

Related U.S. Application Data

(60) Provisional application No. 63/124,350, filed on Dec. 11, 2020.

(51) Int. Cl.
A47G 29/14 (2006.01)
B64C 39/02 (2023.01)
B64F 1/00 (2024.01)
B64F 1/32 (2006.01)
B64U 101/60 (2023.01)

(52) U.S. Cl.
CPC .......... *A47G 29/141* (2013.01); *B64C 39/024* (2013.01); *B64F 1/007* (2013.01); *B64F 1/32* (2013.01); *A47G 2029/142* (2013.01); *A47G 2029/147* (2013.01); *B64U 2101/60* (2023.01)

(58) Field of Classification Search
CPC ................ E01F 3/00; B64F 1/007; B64F 1/32
See application file for complete search history.

(56) References Cited

U.S. PATENT DOCUMENTS

| | | | |
|---|---|---|---|
| 6,079,668 A * | 6/2000 | Brown | B64F 1/36 244/114 R |
| 9,840,340 B2 | 12/2017 | O'Toole | |
| 10,457,421 B2 | 10/2019 | O'Toole | |
| 2018/0290764 A1* | 10/2018 | McMillian | G08G 5/0026 |
| 2019/0233103 A1 | 1/2019 | High et al. | |
| 2019/0152701 A1* | 5/2019 | Eck | B65G 67/24 |
| 2019/0217971 A1 | 7/2019 | Comerford | |
| 2019/0236521 A1 | 8/2019 | High et al. | |
| 2019/0300202 A1* | 10/2019 | High | G06Q 10/08 |
| 2019/0367185 A1* | 12/2019 | Zambelli | B64U 70/90 |
| 2020/0010214 A1 | 1/2020 | Newcomb | |
| 2020/0013008 A1* | 1/2020 | Newcomb | G05D 1/0022 |
| 2020/0198803 A1* | 6/2020 | Zhou | B64C 39/02 |
| 2020/0398999 A1* | 12/2020 | Ortiz | G07C 9/25 |
| 2020/0407079 A1* | 12/2020 | Kim | B64F 1/32 |
| 2021/0070468 A1* | 3/2021 | Svirsky | B64F 1/222 |
| 2021/0214159 A1* | 7/2021 | Tazume | B65G 1/0435 |

FOREIGN PATENT DOCUMENTS

| | | | | |
|---|---|---|---|---|
| CN | 112523575 A | * | 3/2021 | ............ E01F 3/00 |
| DE | 20115011 U1 | * | 12/2001 | ............ B64F 1/30 |
| DE | 202014000236 U1 | * | 3/2014 | ......... A47G 29/1216 |

* cited by examiner

*Primary Examiner* — Tien Q Dinh
*Assistant Examiner* — William L Gmoser
(74) *Attorney, Agent, or Firm* — IPTechLaw

(57) ABSTRACT

Implementations of drone landing pad systems may include a body having a landing pad receptacle and a package receptacle coupled to the landing pad receptacle, an extension mechanism coupled within the landing pad receptacle, and a landing pad coupled to the extension mechanism and configured to couple within the landing pad receptacle. The extension mechanism may be configured to lift the landing pad to an elevated position to receive a package from a drone. The landing pad may be configured to tilt to transfer the package into the package receptacle.

19 Claims, 14 Drawing Sheets

DRONE LANDING PAD SYSTEM AND RELATED METHODS

CROSS REFERENCE TO RELATED APPLICATIONS

This document claims the benefit of the filing date of U.S. Provisional Patent Application 63/124,350, entitled "Drone Landing Pad System and Related Methods" to Dunn which was filed on Dec. 11, 2020, the disclosure of which is hereby incorporated entirely herein by reference.

BACKGROUND

1. Technical Field

Aspects of this document relate generally to drones and drone landing pad related systems.

2. Background

A drone landing pad may be configured to have a drone land thereon. Drones are unmanned aerial vehicles. Drones may fly autonomously. Drones may be used for photography, surveillance, science, agriculture, and to deliver goods, such as food or packages.

SUMMARY

Implementations of a drone landing pad system may include a body having a landing pad receptacle and a package receptacle coupled to the landing pad receptacle, an extension mechanism coupled within the landing pad receptacle, and a landing pad coupled to the extension mechanism and configured to couple within the landing pad receptacle. The extension mechanism may be configured to lift the landing pad to an elevated position to receive a package from a drone. The landing pad may be configured to tilt to transfer the package into the package receptacle.

Implementations of drone landing pad systems may include one, all, or any of the following:

The extension mechanism may include a scissor lift.

The package receptacle may include a sloped back wall facing the extension mechanism.

The package receptacle may include three or more package storage compartments.

The package receptacle may include a divider configured to divide the package receptacle into a first package storage compartment and a second package storage compartment. The divider may be configured to reversibly extend across the package receptacle.

The body may include a stabilizing section comprising a plurality of adjustable legs configured to level the drone landing pad system.

The drone landing pad system may include a landing pad receptacle lid coupled to the landing pad receptacle and a package receptacle lid coupled to the package receptacle.

Implementations of a drone landing pad system may include a body having a landing pad receptacle and a package receptacle coupled to the landing pad receptacle, an extension mechanism coupled within the landing pad receptacle, and a landing pad coupled to the extension mechanism and configured to couple within the landing pad receptacle. The extension mechanism may be configured to lift the landing pad to an elevated position to receive a package from a drone. The landing pad may be configured to extend in a direction substantially perpendicular to the direction the landing pad is lifted by the extension mechanism after the landing pad is in the elevated position.

Implementations of drone landing pad systems may include one, all, or any of the following:

The landing pad may include a plurality of flaps configured to fold out and away from a center of the landing pad when the landing pad is in the elevated position.

The landing pad may be configured to slide along a landing pad rail in the direction substantially perpendicular to the direction the landing pad is lifted by the extension mechanism.

The drone landing pad system may include a divider configured to cover a package placed in the package receptacle. The divider may be configured to hold a second package placed in the package receptacle.

The extension mechanism may be a scissor lift.

The package receptacle may be climate controlled.

Implementations of a drone landing pad system may include a body having a landing pad receptacle and a package receptacle coupled to the landing pad receptacle, a scissor lift coupled within the landing pad receptacle, a landing pad rail rotatably coupled to the scissor lift, and a landing pad slidably coupled to the landing pad rail. The scissor lift may be configured to lift the landing pad to an elevated position to receive a package from a drone. A surface of the landing pad configured to receive the package may be substantially perpendicular to the direction the scissor lift raises the landing pad when the landing pad is in an elevated position. The landing pad may be configured to retract within the landing pad receptacle. The surface of the landing pad may be substantially parallel to the direction the scissor lift raises the landing pad when the landing pad is in a retracted position.

Implementations of drone landing pad systems may include one, all, or any of the following:

The landing pad rail may be configured to rotate 90 degrees.

The landing pad may be configured to retract within the landing pad receptacle after the package is delivered from the drone.

The landing pad may be configured to be lifted by the scissor lift in a first direction and may be configured to move along the landing pad rail in a second direction substantially perpendicular to the first direction.

Implementations of the drone landing pad system may include a package receptacle lid coupled to the package receptacle and a landing pad receptacle lid coupled to the landing pad receptacle. The scissor lift and the drone landing pad may be configured to be completely enclosed by the drone landing pad system when the drone landing pad is in a retracted position.

The scissor lift may include a first guide rail track and a second guide rail track.

The scissor lift may include one or more extension springs coupled thereto.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended drone landing pad systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such drone landing pad systems, and implementing components and methods, consistent with the intended operation and methods.

As used herein, "drone" refers to an unmanned aerial vehicle (UAV). The drone landing pad systems disclosed herein may be compatible with and configured to receive packages delivered by any type of drone capable of landing on a landing pad, tethering to the landing pad, or dropping a package down onto the landing pad.

Figure 1:
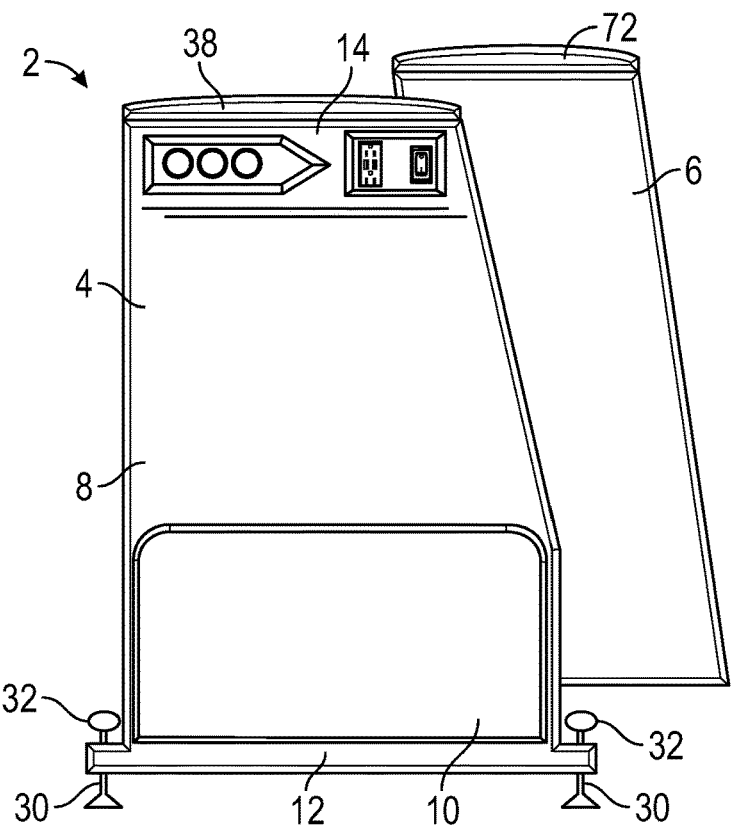
FIG. 1 is a side view of a drone landing pad system.

Referring to FIGS. 1-5, various views of an implementation of a drone landing pad system are illustrated. Referring specifically to FIG. 1, a side view of a drone landing pad system is illustrated. The drone landing pad system 2 includes a body 4. In various implementations, the body may include a package receptacle 6, a landing pad receptacle 8, a lift control section 10, a stability control section 12, an electronic control section 14, and any combination thereof.

Figure 4:
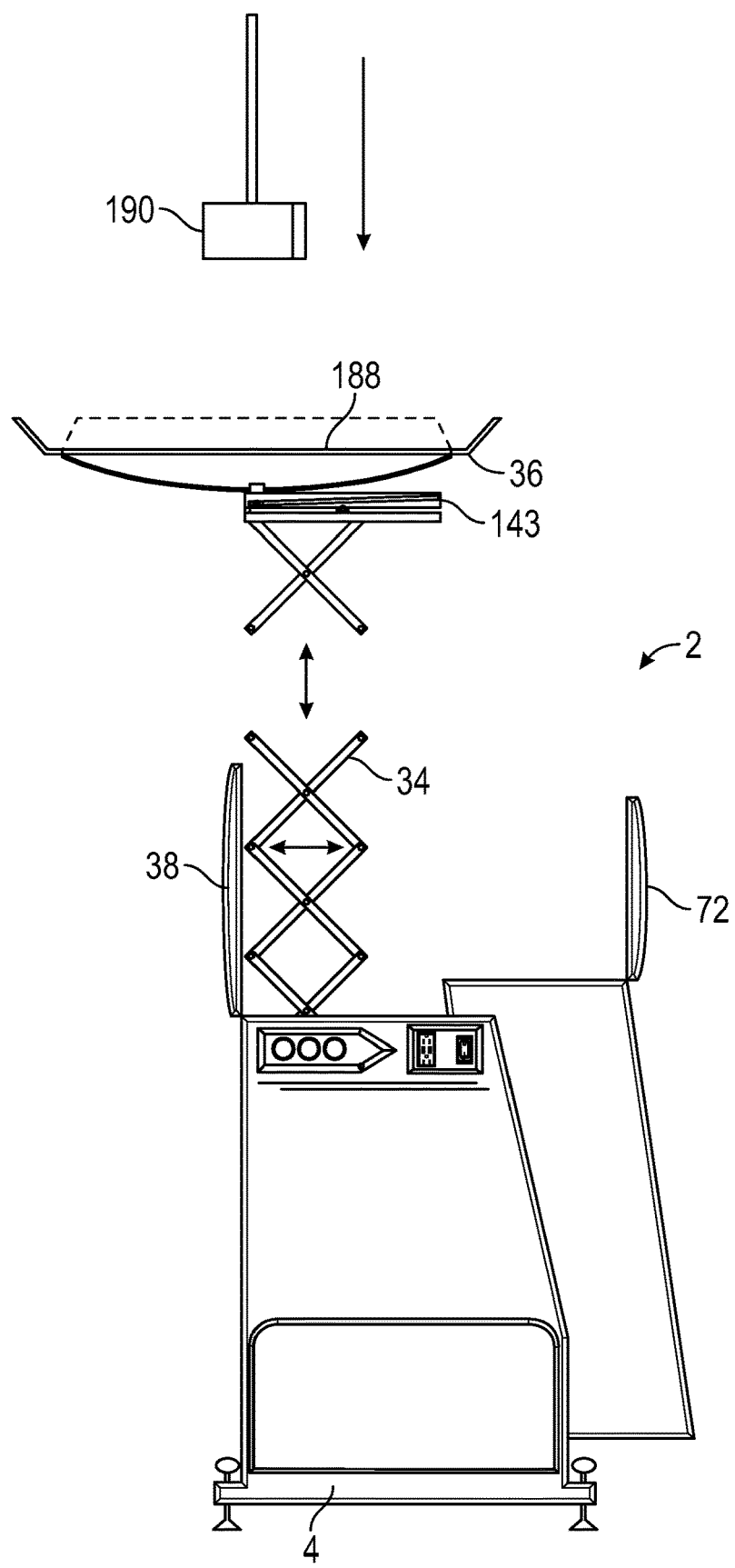
FIG. 4 is a side view of the drone landing pad system of FIG. 1 with the landing pad in an elevated position.
Figure 5:
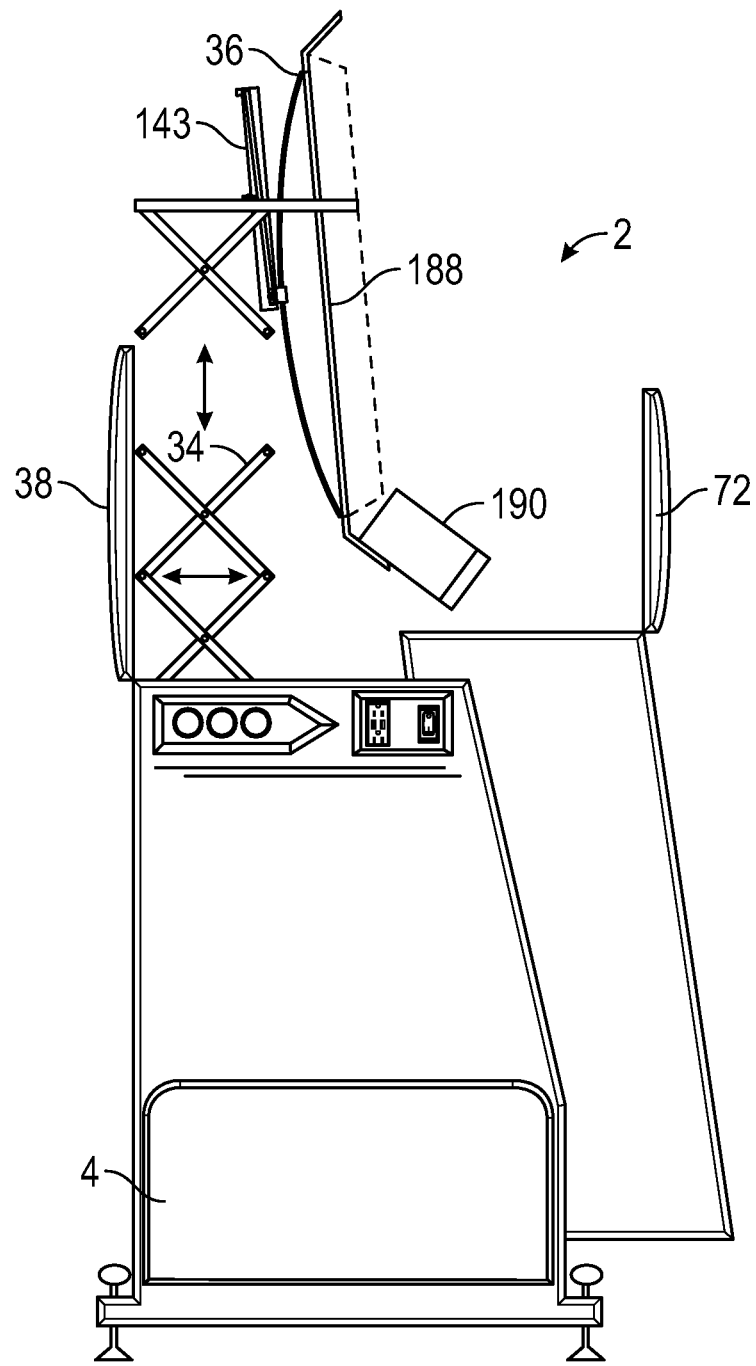
FIG. 5 is side view of the drone landing pad system of FIG. 1 with the landing pad in a tilted position.
Figure 6:
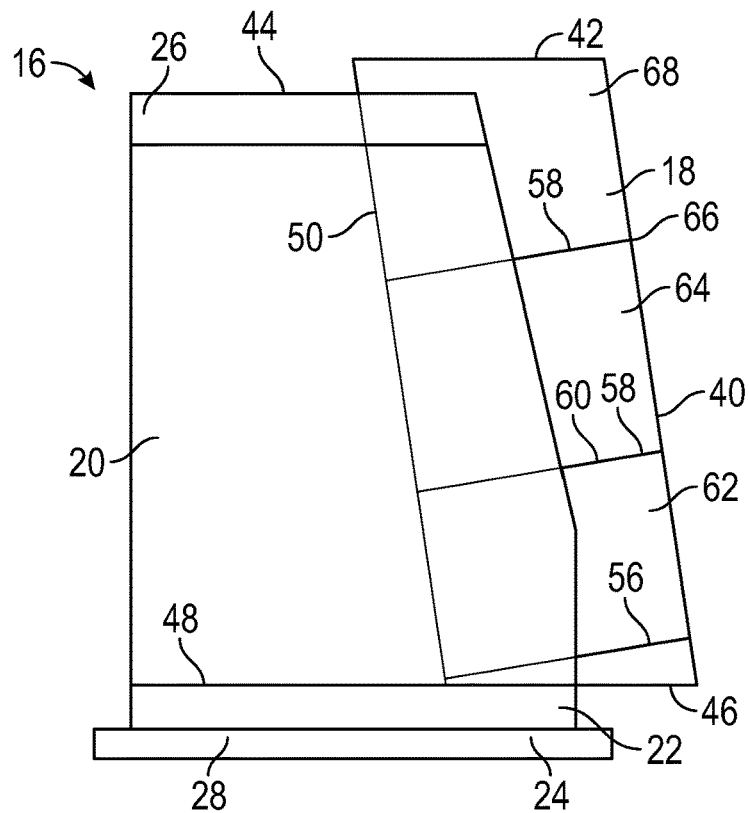
FIG. 6 is a side view of a body of a drone landing pad system.
Figure 7:
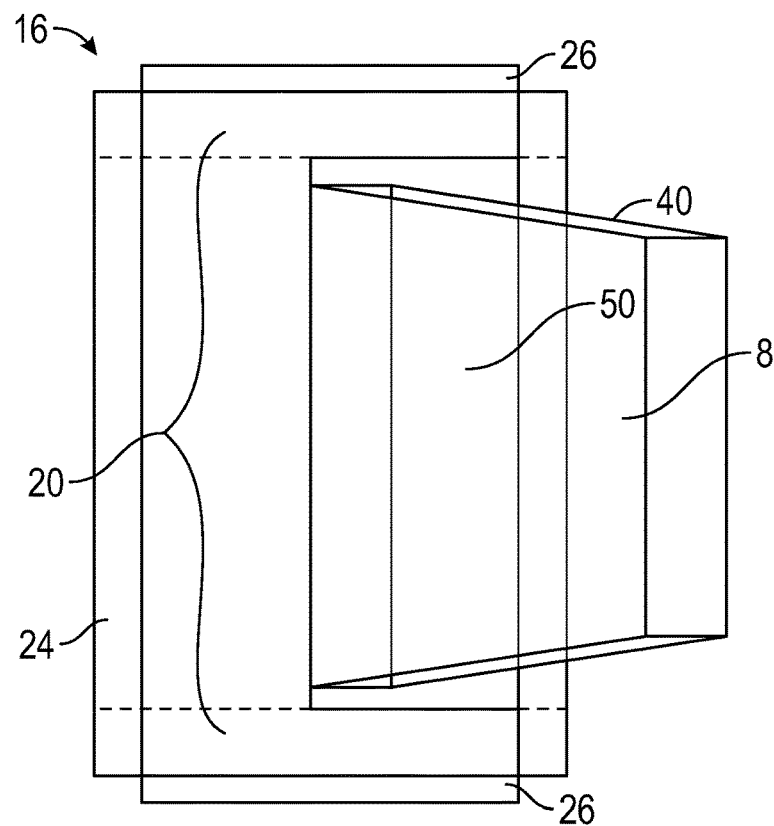
FIG. 7 is a top view of the body of FIG. 6.
Figure 8:
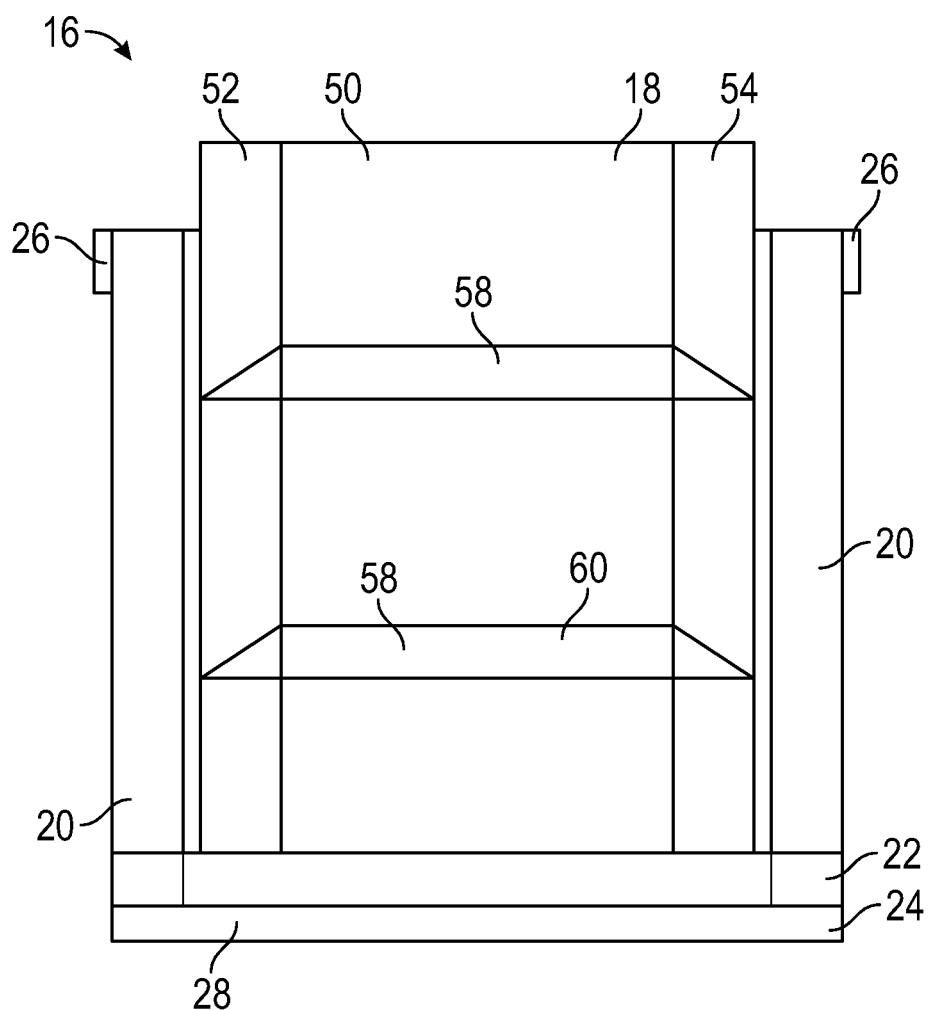
FIG. 8 is a front view of the body of FIG. 6.

Referring to FIGS. 6-8, the body of a drone landing pad system is illustrated. Referring specifically to FIG. 6, a side view of the body of the drone landing pad system is illustrated. Referring to FIG. 7, a top view of the body of FIG. 6 is illustrated. Referring to FIG. 8, a front view of the body FIG. 6 is illustrated. Similar to the body 4 of the drone landing pad system 2 of FIGS. 1-5, the body 16 includes the package receptacle 18, a landing pad receptacle 20, a lift control section 22, a stability control section 24, and an electronic control section 26. Any elements or features of the body 16 of FIG. 6 through 8 may also be included in any other implementation of a drone landing pad system disclosed herein, including the drone landing pad system 2 of FIGS. 1-5.

Still referring to FIGS. 6-8, the body 16 may include a stability control section configured to stabilize, keep level, or stabilize and keep level the body 16, and in turn the drone landing pad system including the body. In various implementations, the stability control section 24 is located at a bottom 28 of the body 16 and may form the lowermost portion of the drone landing pad system. As used herein, terms of orientation and position, such as, by non-limiting example, "bottom," "lowest," "top," "upper," "below," and "above," are understood to be interpreted in conjunction with the orientation of the landing pad system of FIGS. 1-5. Referring back to FIG. 1 and FIG. 2 (which illustrates a front view of the drone landing pad system of FIG. 1) the stability control section 12 may include a plurality of legs 30. The plurality of legs 30 may be adjustable. In such implementations, the plurality of legs may include threaded rods configured to extend through a plurality of threaded openings in the stability control section 12. In such implementations, the height of each leg of the plurality of legs may be adjusted by rotating the leg. In other implementations, other adjustment mechanisms may be used to adjust the height of the plurality of legs and in turn level and/or stabilize the drone landing pad system 2. In various implementations, the plurality of legs 30 may be configured to level the drone landing pad system 2 along an X, Y, and/or Z access. In various implementations, the plurality of legs 30 may be adjusted manually or automatically. In implementations where the plurality of legs are adjusted manually, the stability control section 12 may include a plurality of handles 32 coupled to the plurality of legs 30. In such implementations, a user may be able to twist a handle of the plurality of handles 32 and in turn raise or lower a corresponding leg of the plurality of legs 30. In implementations where the plurality of legs are adjusted automatically, the stability control section may be configured to detect whether the drone landing pad system 2 is level through a leveling device, and in turn, may automatically adjust a plurality of legs 30 to level the drone landing pad system.

In various implementations, portions of the stability control section may include or may be configured to include weights. The weights may stabilize the unit during deployment of the extension mechanism, retraction of the extension mechanism, or through various weather conditions and prevent the drone landing pad system from undesired movement. In particular implementations, the stability control section may include a water bladder that can be filled and act as a weight to stabilize the drone landing pad system 2. In such implementations, the stability control section may include a fill opening and a drain through which water may enter and exit the stability control section.

In various implementations, the stability control section may include an anchor configured to secure the drone landing pad system 2 the ground or another structure in order to prevent unwanted movement of the drone landing pad system. In various implementations, the anchor may lock the drone landing pad system to the ground or another structure in order to prevent theft of the drone landing pad system. In other implementations, the anchor may not be part of the stability control section but may be attached to or part of some other portion of the body 4 of the drone landing pad system 2.

Referring back to FIGS. 6 and 8, the body 16 includes a lift control section 22. The lift control section 22 may be positioned above the stability control section 24. In particular implementations, the lift control section 22 may be immediately above the stability control section 24. The lift control section may be configured to house any lift control mechanisms disclosed herein including, by nonlimiting example, a motor, battery, threaded rod, controller, converter, guide rails, other electronic components, or any other mechanism used to lift the landing pad. In various implementations, the lift control section 22 may be configured to house a bottom of an extension mechanism within the lift control section 22.

In various implementations, the lift control section 22 may include a door configured to grant access within the lift control section 22. Such door may allow a user access to the lift control mechanisms housed within the lift control section 22.

Figure 3:
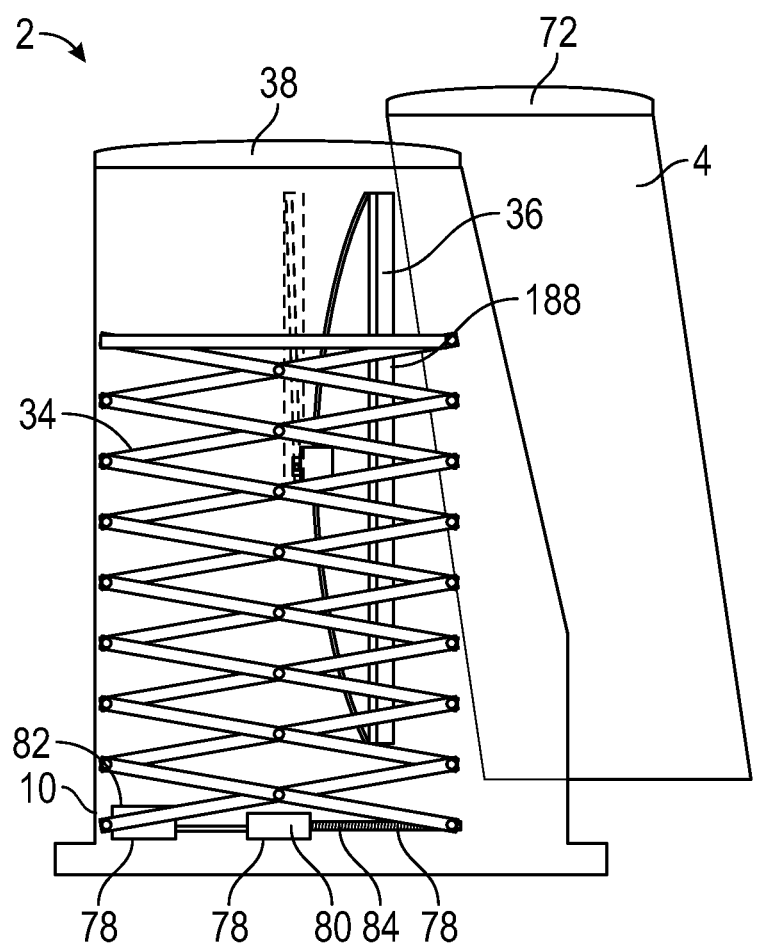
FIG. 3 is a side view of the drone landing pad system of FIG. 1 illustrating the scissor lift and landing pad within the landing pad receptacle.

Still referring to FIGS. 6-8, the body 16 includes a landing pad receptacle 20. The landing pad receptacle 20 may be located above the lift control section 22. In particular implementations, the landing pad receptacle 20 may be located immediately above the lift control section 22. The landing pad receptacle 20 may be configured to house the rest of the extension mechanism not coupled within the lift control section 22 when the extension mechanism is in a retracted position. In various implementations, the landing pad receptacle 20 is also configured to house a landing pad when the extension mechanism is in the retracted position. An implementation of a landing pad receptacle 8 housing an extension mechanism 34 and a landing pad 36 is illustrated by FIG. 3, which illustrates a side view of the drone landing pad system of FIG. 1 with the scissor lift and landing pad within the landing pad receptacle.

In various implementations, the landing pad receptacle may include a door on a side of the landing pad receptacle through which a user may be able to access the extension mechanism, landing pad, or any other component housed within the landing pad receptacle. In other implementations, the landing pad receptacle may not include a door on a side of the landing pad receptacle.

Referring back to FIGS. 6-8, in various implementations the body 16 may include an electronic control section 26. The electronic control section 26 may be located at a top of the body 16. As illustrated by FIG. 7, electronic control section 26 may include two separate sections, each coupled to an outer surface of the landing pad receptacle 20. In other implementations, the electronic control section 26 may include only a single section. In various implementations, the electronic control section 26 may include controls configured to deploy a landing pad, retract the landing pad, reset the drone landing pad system, power on or off the drone landing pad system, access the internet, open or close a landing pad receptacle lid or package receptacle lid, rotate a landing pad, fold away flaps on a landing pad, or operate any other portion of the drone landing pad system. Further, in various implementations the electronic control section 26 may include a power outlet, batteries, controllers, a screen, battery charging monitors, lights configured to alert a user, speakers configured to transmit sounds to alert a user, other electronic components, or any combination thereof. In various implementations, the components within the electronic control section 26 may be configured to control or operate any portion of the drone landing pad system.

Referring back to FIGS. 1-5, in various implementations the drone landing pad system 2 may include a landing pad receptacle lid 38. In various implementations, the landing pad receptacle lid 38 may be considered part of the body 4 or separate from the body 4. In various implementations, the landing pad receptacle lid 38 may be hingedly coupled to the landing pad receptacle 8. In other implementations the landing pad receptacle lid 38 may be slidably coupled to the landing pad receptacle 8. In various implementations, the drone landing pad system 2 may include a motor configured to open and close the landing pad receptacle lid 38. In other implementations were the landing pad receptacle lid 38 is hingedly coupled to the landing pad receptacle 8, the landing pad receptacle lid 38 may be opened by the extension mechanism 34 lifting up and pushing the landing pad receptacle lid 38. In turn, the landing pad receptacle lid 38 may fall shut when extension mechanism 34 and the landing pad 36 retract back into the landing pad receptacle 8.

In various implementations including a landing pad receptacle lid 38, the landing pad receptacle lid may be configured to lock in a closed configuration. In such implementations, the landing pad receptacle lid 38 may automatically unlock when the landing pad 36 needs to be deployed.

Referring back to FIGS. 6-8, the body 16 includes a package receptacle 18. In various implementations, the package receptacle 18 may be located at a front of the body 16. In other implementations the package receptacle may be located on any other side of the body. In various implementations, and as illustrated by FIGS. 6-7, the package receptacle 18 may extend into a portion of the landing pad receptacle 20. In such implementations, and as illustrated by FIGS. 7-8, the width of the package receptacle 18 may be less than the width of the landing pad receptacle 20. In implementations including a scissor lift extension mechanism, the arms of the scissor lift extension mechanism may run along two opposing sides of the portion of the package receptacle 18 extending into the landing pad receptacle 20. In such implementations, the package receptacle 18 does not interfere with the extension mechanism housed within the landing pad receptacle 20. In other implementations, the package receptacle 18 does not extend into the landing pad receptacle 20.

In various implementations, a top 42 of the package receptacle 18 may extend above a top 44 of the landing pad receptacle 20. In other implementations, the top 42 of the package receptacle 18 may be coextensive with or below the top 44 of the landing pad receptacle 20. In various implementations, a bottom 46 of the package receptacle 18 may be coextensive with a top 48 of the lift control section 22. In other implementations, the bottom 46 the package receptacle 18 may be above the top 48 of the lift control section 22 or below the top of the lift control section.

Still referring to FIGS. 6-8, the package receptacle 18 includes a back wall 50. In various implementations, the outer surface of the back wall 50 is configured to face the extension mechanism housed in the landing pad receptacle 20. In various implementations, the back wall 50 may be sloped. In various implementations, the slope of the back wall may be straight while in other implementations the slope of the back wall may be curved. In implementations having a sloped back wall, a delivered package may be configured to slide down the sloped back wall. Because the package is configured to slide down the back wall rather than dropping to the bottom of the package receptacle, damage to the package upon delivery of the package may be reduced by the sloped back wall 50. In other implementations, the back wall may not be sloped.

Referring to FIG. 8, the package receptacle 18 includes a first sidewall 52 and a second sidewall 54 directly coupled to the back wall 50. In various implementations, a right angle may be formed between the first sidewall 52 and the back wall 50 as well as between the second sidewall 54 and the back wall 50. In other implementations, the angle between the first sidewall 52 and the back wall 50 and the second sidewall 54 and back wall 50 may be more than or less than 90°. In various implementations, the package receptacle 18 may include a front wall opposite the back wall 50. The front wall may extend across an entirety of the front of the package receptacle. In such implementations, the package receptacle may include only a single package storage compartment and a user may be configured to retrieve a delivered package through an opening at the top of the package receptacle through which the package was delivered. In other implementations, the front wall may include one or more openings therein through which a user may retrieve a package. In other implementations, the package receptacle 18 may not include a front wall. In such implementations, the package receptacle may always be accessible and open or the package receptacle may include one or more retrieval doors opposite the back wall 50 used to secure the delivered package in the package receptacle.

Referring to FIG. 6, in various implementations the floor 56 of the package receptacle may form a right angle with the back wall 50. In other implementations, the floor 56 of the package receptacle may form an obtuse angle with the back wall 50. In implementations where the back wall 50 is sloped, and the floor 56 of the package forms a right angle with the back wall 50, the slope of the floor of the package receptacle 18 may facilitate retrieval of a package from within the package receptacle.

As illustrated by FIGS. 6-8, the package receptacle includes a top opening through which packages are delivered into the package receptacle 18. In various implementations, the top opening of the package receptacle may be substantially parallel to the bottom of the body 4 (or to the stability control section 24). In other implementations the top opening of the package receptacle may be angled. In such implementations, the top opening of the package receptacle may support the transition of a package from the landing pad to inside the package receptacle.

In various implementations, the package receptacle includes a single package storage compartment. In other implementations, the package receptacle includes two, three, or more than three package storage compartments. In implementations including multiple package storage compartments, the storage package compartments may be stacked on top of one another. In such implementations, and as illustrated by FIGS. 6 and 8, the package receptacle 18 includes one or more dividers 58 configured to divide the package receptacle into a plurality of package storage compartments. In such implementations, the one or more dividers may form a seal (which may be airtight) between the one or more storage compartments. Each of the one or more dividers 58 are configured to be positioned outside of the package receptacle, against the walls of the package receptacle, or within the walls of the package receptacle so that the package receptacle is capable of having only a single package storage compartment. After a package is delivered and slides to the bottom of the package receptacle, a first divider 60 of the one or more dividers 58 may then be configured to reversibly extend across the package receptacle over the delivered package and divide the package receptacle into a first storage compartment 62 and a second storage compartment 64. "Reversibly extend," as used herein, means that the divider can extend across the package receptacle and can also move back to the original position of the divider that the divider was in prior to the divider extending across the package receptacle. Once the first divider extends across the package receptacle 18, the first divider 60 serves as a top of the first storage compartment 62 and as a floor of the second storage compartment 64. After a second package is delivered into the package receptacle 18, it may rest upon the first divider 60. After delivery of the second package onto the first divider 60, a second divider 66 may then reversibly extend across the package receptacle 18 above the second package and divide the second package compartment 64 into an additional third package compartment 68. The second divider 66 then serves as a top of the second storage compartment 64 and as a floor of the third storage compartment 68. In various implementations, the one or more dividers 58, when extended across the package receptacle, may be parallel to the floor 56 of the package receptacle. In other implementations, the one or more dividers, when extended across the package receptacle, may not be parallel to the floor 56 of the package receptacle. While the implementation illustrated by FIGS. 6 and 8 illustrates three separate package storage compartments and two dividers, it is understood that other implementations of package storage compartments may include no dividers, only a single divider, or more than 2 dividers resulting in any number of package storage compartments. After a package is retrieved and removed from the corresponding package storage compartment, the divider upon which the received package rested may then retract or foldaway so as to not extend across the package receptacle and divide the package receptacle. In implementations comprising one or more dividers, if a delivered package is larger than a single storage compartment, the size of the package may be detected by a sensor and the divider that would have interfered with the package may not reversibly extend across the package receptacle 18. Accordingly, using the example of the package receptacle 18 of FIGS. 6 and 8, if the delivered package occupied both of the first storage compartment 62 and the second storage department 64, then the first divider 60 would remain retracted or folded away and the second divider 66 then extend across the package receptacle and divide the package receptacle into a first and second compartment.

In various implementations, the drone landing pad system may include divider motors, controllers, and sensors configured to automatically extend a divider across the package receptacle and divide the package receptacle into multiple storage compartments upon delivery of a package into the package receptacle. The divider motors, controllers, and sensors may also be configured to automatically retract or fold away the divider from across the package receptacle upon removal of a package from the package receptacle. Any of the divider controllers may be included in the electronic control section or any other section of the body.

Figure 2:
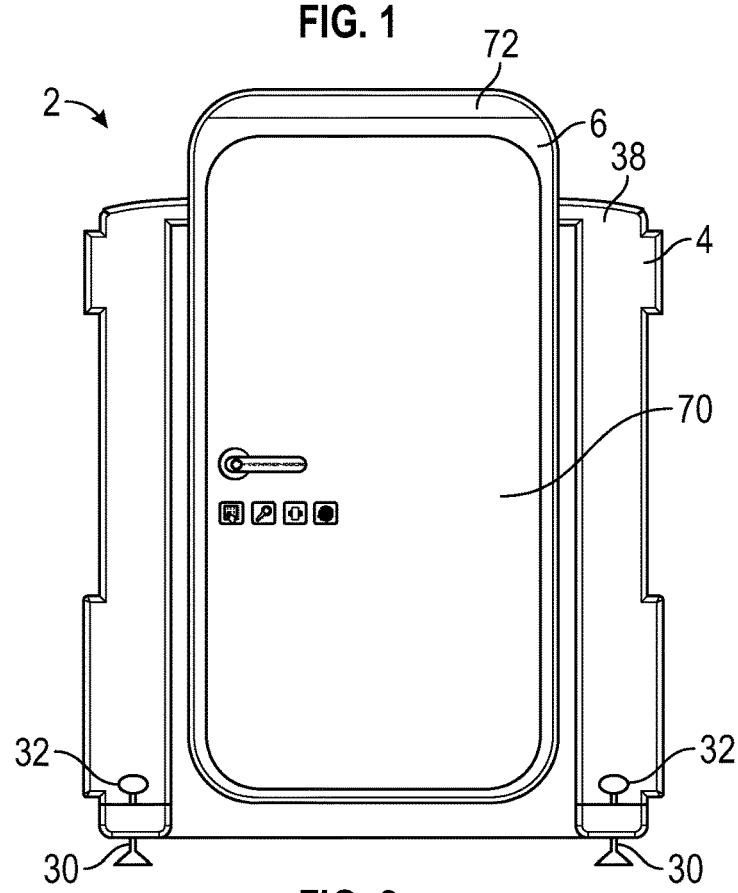
FIG. 2 is a front view of the drone landing pad system of FIG. 1.

In various implementations, the package receptacle may include one or more retrieval doors. Referring to FIG. 2, package receptacle 6 includes a retrieval door 70. In various implementations, the package receptacle may include only a single retrieval door which provides access to one or more storage compartments therein. In other implementations, the package receptacle may include multiple retrieval doors providing access to multiple storage compartments therein. In particular implementations, the number of retrieval doors included in the package receptacle may correspond with (or be the same as) the maximum number of possible storage compartments within the package receptacle.

In various implementations, the retrieval door may include a locking mechanism and may require a particular code, key, fingerprint, facial recognition match, or signal from a mobile device associated with the owner of the package being retrieved from the user in order to access the package. In such implementations, security of the packages may be ensured as they are kept in a locked storage compartment. In other implementations, the package receptacle may not include a locking mechanism on the retrieval door. In still other implementations, the package receptacle may not include a retrieval door at all but may include a retrieval opening configured to constantly allow access to the package receptacle through the retrieval opening.

Still referring to FIGS. 6 and 8, in various implementations, the package receptacle 18 may be climate controlled. In such implementations, the package receptacle 18 may be insulated. In particular implementations, the climate controlled package receptacle may be heated or cooled. In various implementations, the drone landing pad system 2 may include a heater and/or a cooler configured to either heat or cool the package receptacle 18 depending upon the package to be received. In various implementations having multiple storage compartments within the package receptacle, the various package storage compartments may have different climate controlled features, such as a heated package storage compartment, a cooled package storage compartment, a non-climate controlled storage compartment, or any combination thereof. In such implementations, the one or more dividers of the package receptacle may include insulative materials.

Referring back to FIGS. 1-5, in various implementations the drone landing pad system 2 may include a package receptacle lid 72. In various implementations, the package receptacle lid 72 may be considered part of the body 4 or separate from the body 4. The package receptacle lid 72 may be hingedly coupled to the package receptacle 6. In other implementations the package receptacle lid 72 may be slidably coupled to the package receptacle 6. In various implementations, the drone landing pad system 2 may include a motor configured to open and close the package receptacle lid 72. In other implementations, the package receptacle lid and the landing pad receptacle lid may both be included in a single lid.

In various implementations including a package receptacle lid 72, the package receptacle lid may be configured to lock in a closed configuration. In such implementations, the package receptacle lid 72 may automatically unlock when a package is to be delivered.

Figure 9:
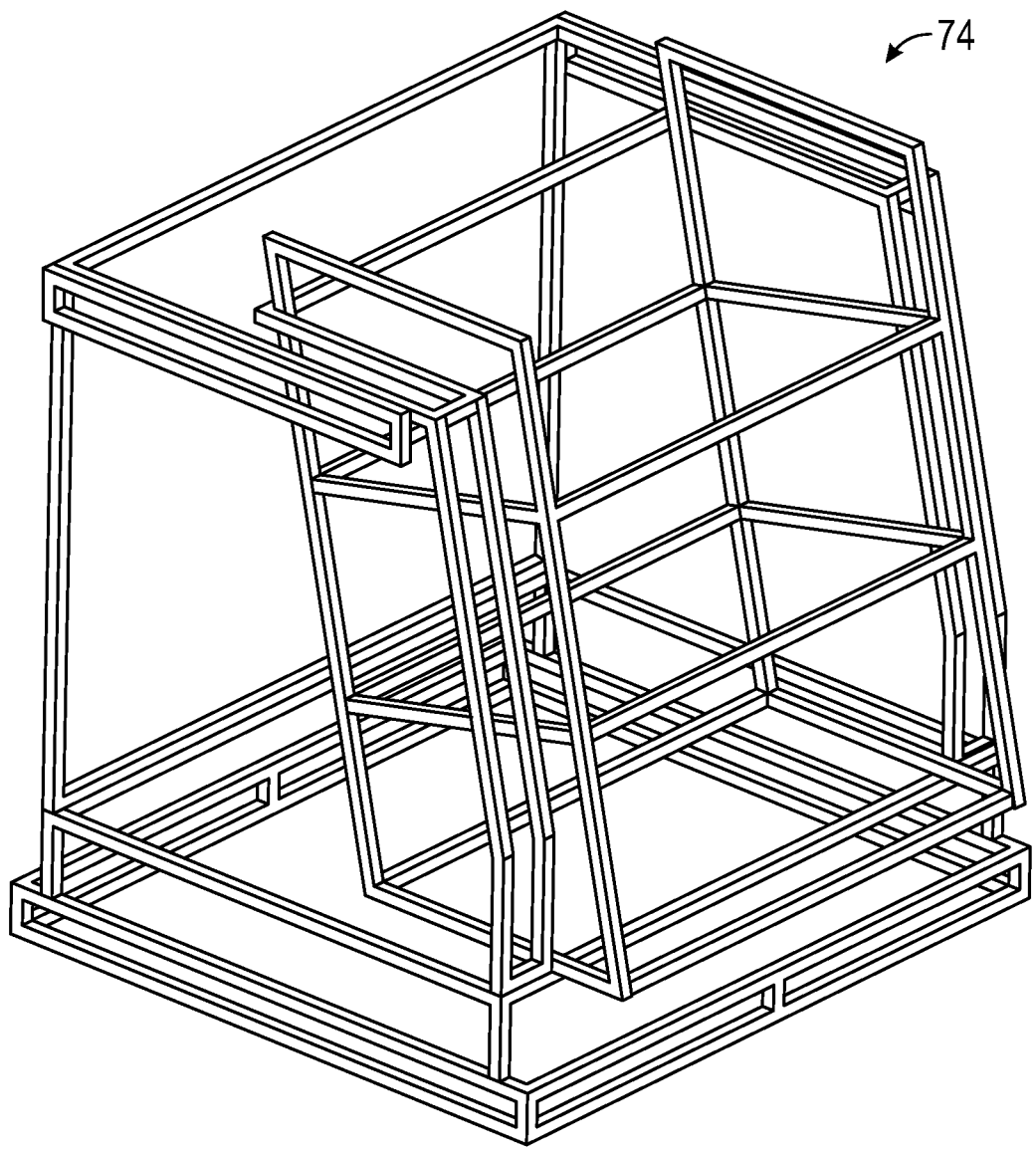
FIG. 9 is a perspective view of a frame of a body of a drone landing pad system.

Referring to FIG. 9, a perspective view of a frame of the body of a drone landing pad system is illustrated. The frame 74 provide structural support to the body and the various receptacles and sections thereof. The frame may be made from a metal, plastic, a composite material, fiber glass, carbon fiber, or any other type of sturdy material.

In various implementations, the body includes an outer shell coupled over the frame. The outer shell may be made from a polymer, metal, composite, fiber glass, carbon fiber, plastic, or other material. The outer shell may include various designs and/or colors to allow the system to be customized by a user. In such implementations, the system may have aesthetic appeal as users will have the ability to determine what the system looks like. By non-limiting example, the body may be designed to appear as a pot, boulder, statue, or other object having aesthetic value.

In various implementations, the outer shell may be watertight and/or tamperproof. In such implementations, both the system and any packages held therein may be protected.

While the bodies of FIGS. 1-8 are illustrated as having a particular design and shape, it is understood that other drone landing pad systems may include bodies having other various designs, shapes, and sizes.

In various implementations the body may include other lights, gauges, sensors, or any combination thereof (such as, by non-limiting example, lights placed within the package receptacle, gauges to indicate charge levels of various batteries, etc.).

Figure 10:
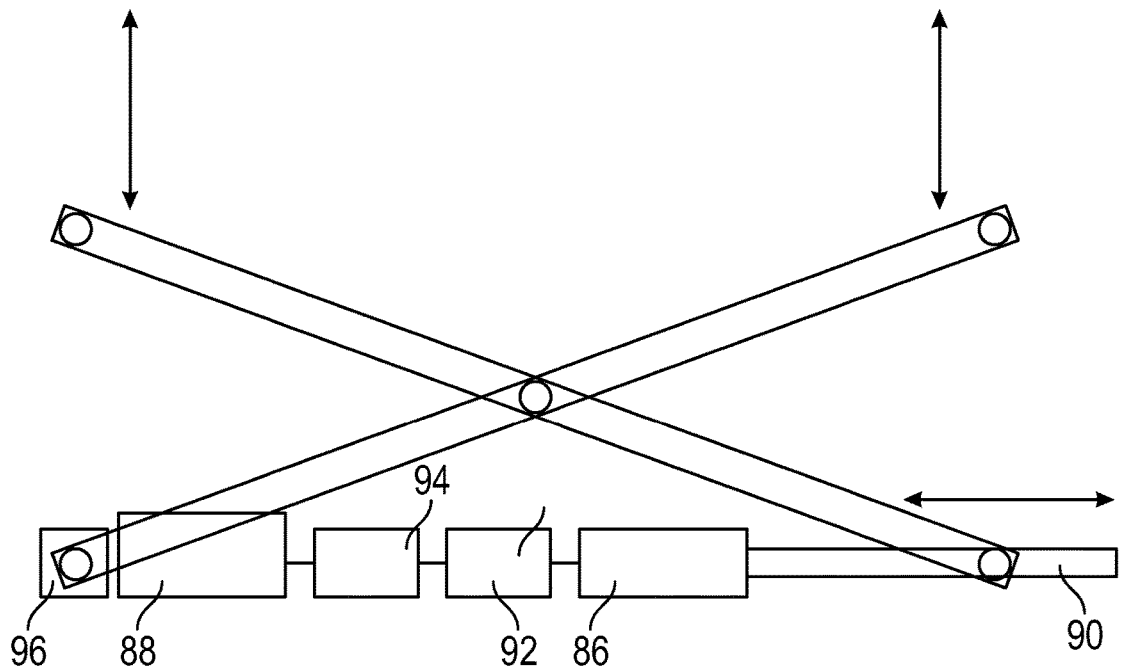
FIG. 10 is a side view diagram of lift control mechanisms.
Figure 12:
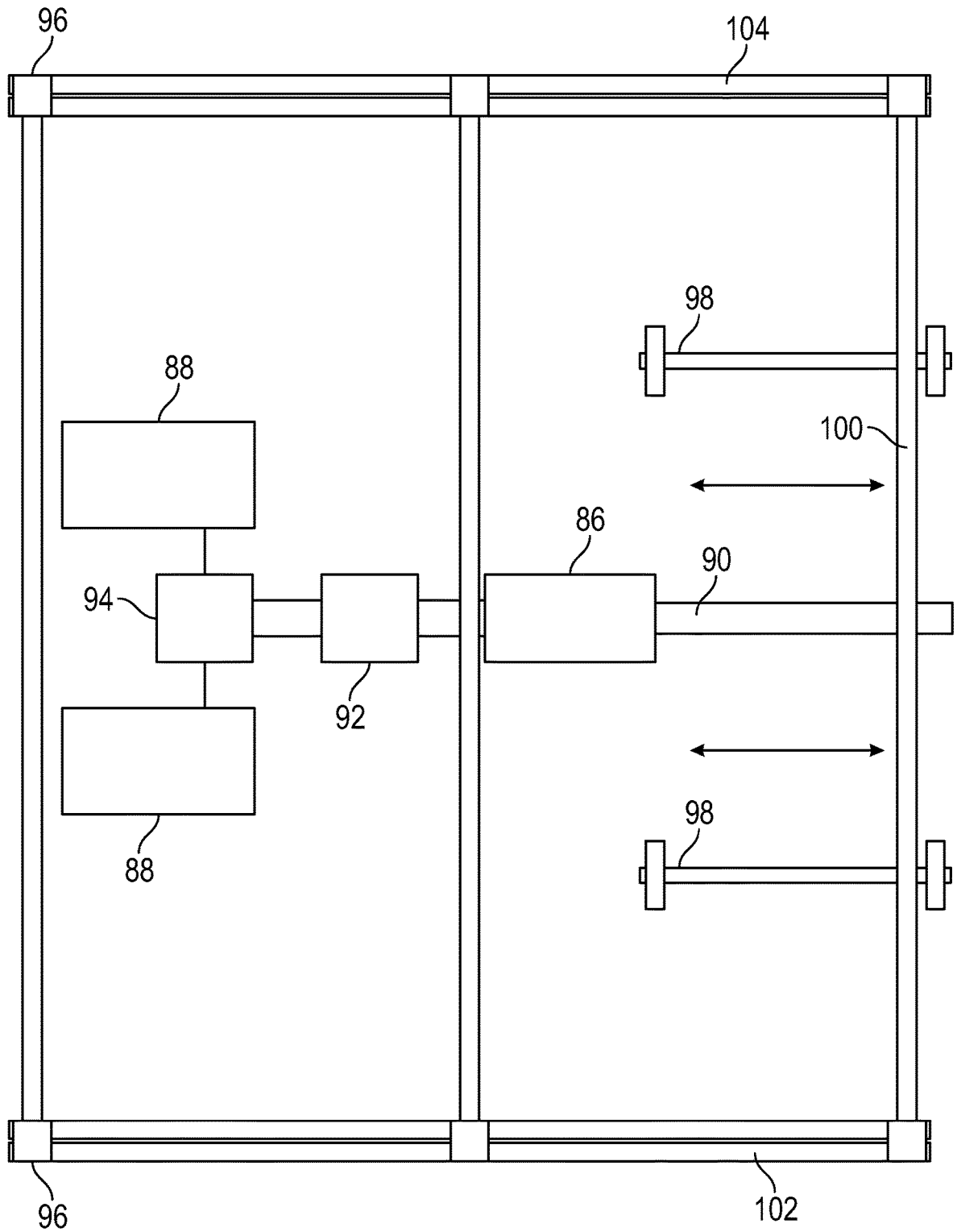
FIG. 12 is a top view of the lift control mechanisms of FIG. 10.

Referring back to FIGS. 3-5, the implementation of the drone landing pad system 2 includes an extension mechanism 34 coupled within the landing pad receptacle 8. While FIG. 3 illustrates the drone landing pad system with a transparent body in order to illustrate components of the drone landing pad system within the body, such as the retracted extension mechanism 34 and landing pad 36, referring to FIG. 4, a side view of the drone landing pad system of FIG. 1 with the landing pad in an elevated position is illustrated. Referring to FIG. 5, a side view of the drone landing pad system of FIG. 1 with the landing pad in an elevated and tilted position is illustrated. Referring specifically to FIG. 3, in various implementations the drone landing pad includes a plurality of lift control mechanisms 78. The lift control mechanisms 78 may be housed within the lift control section 10 of the body. In various implementations, the lift control mechanisms 78 include devices used to control the lift of the extension mechanism 34, and in turn, the deployment and retraction of the landing pad 36. While FIG. 3 illustrates the lift control mechanisms as including a motor 80, a battery 82, and a threaded rod 84, other implementations include more and/or other types of lift control mechanisms. Referring to FIG. 10, a side view diagram of lift control mechanisms are illustrated. Referring to FIG. 12, a top view diagram of the lift control mechanisms of FIG. 10 are illustrated. Any of the lift control mechanisms illustrated in FIGS. 10 and 12 may also be included in the drone landing pad system 2 of FIGS. 1-5. Referring to FIGS. 10 and 12, in various implementations the lift control mechanisms may include a motor 86, a power source 88, a threaded rod 90, a controller 92, a converter 94, and an extension mechanism anchor 96. While only illustrated by FIG. 12, in various implementations the lift control mechanisms may also include one or more linear rail guide tracks 98 configured to facilitate smooth lateral movement of a scissor lift mechanism. In implementations including the one or more linear rail guide tracks 98, the front and bottom most scissor lift brace 100 of the scissor lift mechanism through which the threaded rod extends may be directly and slidably coupled to the linear rail guide tracks 98 to ensure smooth movement of a scissor lift mechanism. In other implementations, the lift control mechanisms may include fewer mechanisms than what is illustrated by FIGS. 10 and 12, more mechanisms than what is illustrated by FIGS. 10 and 12, and/or different types of mechanisms than what is illustrated by FIGS. 10 and 12. In particular implementations, the lift control mechanisms may include one or more switches configured to stop the motor and in turn stop the extension mechanism at one or more predetermined heights. The lift control mechanisms may allow for precise control of the deployment and retraction of the landing pad.

In various implementations, the power source 88 includes one or more batteries configured to provide power to the system and/or provide power to the motor for the one or more extension mechanisms and/or the one or more divider motors. In other implementations, the system may be configured to receive power from a power outlet. In particular implementations, the system may be configured to receive power from a power outlet and also have batteries as backups in the event of power outages. In various implementations, power from the power outlet may be configured to charge the batteries. In other implementations, the drone landing pad system may include one or more solar panels configured to either charge one or more batteries or otherwise provide power to the system. In implementations including one or more solar panels, the one or more solar panels may be coupled over the landing pad receptacle lid, the package receptacle lid, or both the landing pad receptacle lid and the package receptacle lid.

In implementations where the extension mechanism is a scissor left, the motor 86 may be configured to turn the threaded rod 90. The threaded rod 90 may extend through a threaded opening of the scissor lift brace 100 of a scissor lift that spans between a first set of scissor lift arms 102 and a second set of scissor lift arms 104. The motor 86 may be configured to rotate the threaded rod 90 in a first direction which moves the scissor lift brace 100 towards the motor and in turn raises the scissor lift, and also rotate the threaded rod 90 in a second direction which moves the scissor lift brace 100 away from the motor and in turn lowers the scissor lift.

In implementations including an extension mechanism anchor 96, the lowest and rearward most portion of each set of scissor lift arms of the scissor lift may be directly coupled to an extension mechanism anchor. The extension mechanism anchor 96 is fixed in place and is not configured to move.

In various implementations, the activation of the motor to deploy or retract the landing pad may be manual and require a user to physically initiate deployment or retraction. In other implementations, the activation of the motor to deploy or retract the landing pad may be based upon a signal received through the internet. In still other implementations, the drone landing pad system may detect the approach of a package to be delivered or a delivered package and in response, activate the motor to deploy or retract the landing pad.

Referring back to FIG. 3, when the extension mechanism 34 and the landing pad 36 are in a retracted position, the extension mechanism 34 and the landing pad 36 are entirely enclosed within the drone landing pad system 2. In various implementations, the extension mechanism may be configured to raise the landing pad 2 feet, 5 feet, 10 feet, or any other height above the top of the landing pad receptacle. In turn, the extension mechanism may be configured to raise the landing pad to an elevated position to receive a package from a drone, as is illustrated by FIG. 4. In such implementations, by raising the landing pad via the extension mechanism, risks to people or pets from the high-level drone delivery is greatly reduced as the drone never descends below the landing pad in the elevated position. Further, by having the drone deliver the package to the landing pad that is elevated, privacy to the recipient of the package may be increased inasmuch as the drone may not be low enough to have cameras of the drone capable of recording directly through a window and into the user's home.

As illustrated by FIG. 3, the extension mechanism 34 may be a scissor lift. In other implementations, other extension mechanisms such as a telescoping extension mechanism, may be used in place of the scissor lift. In implementations where the extension mechanism is a scissor lift, the scissor lift may include two sets of scissor lift arms (as illustrated by FIG. 12).

Figure 11:
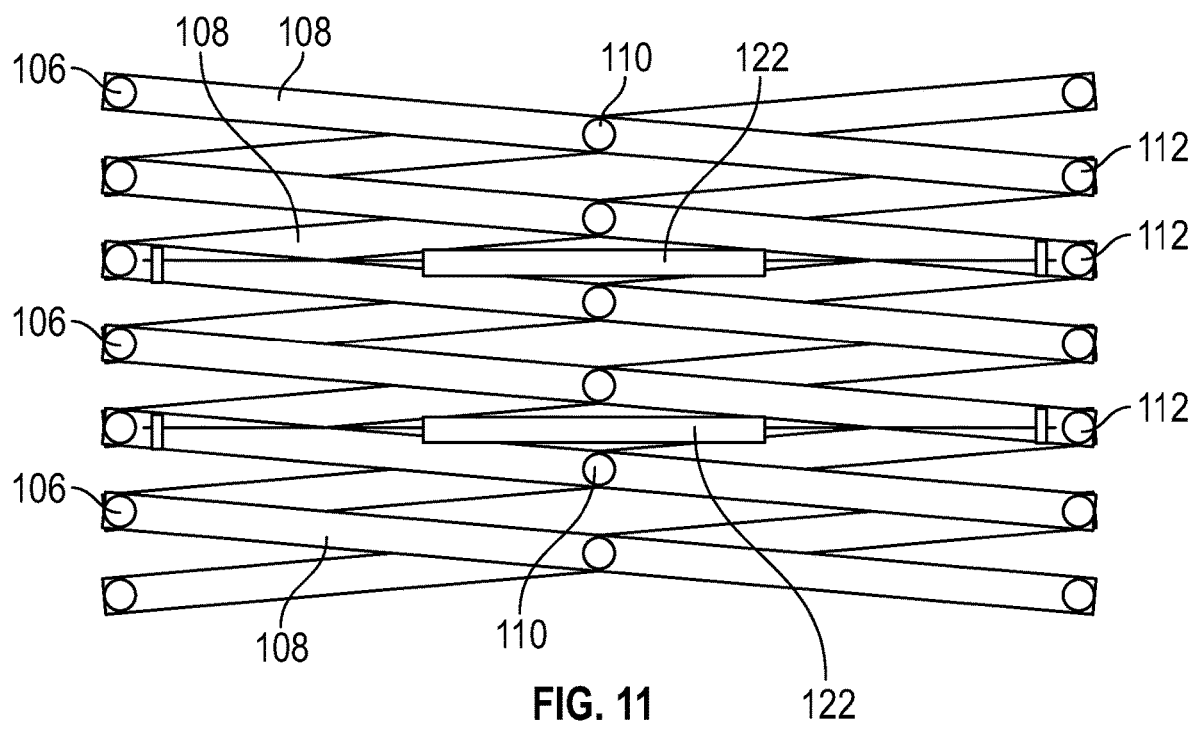
FIG. 11 is a side view of a set of scissor lift arms.
Figure 18:
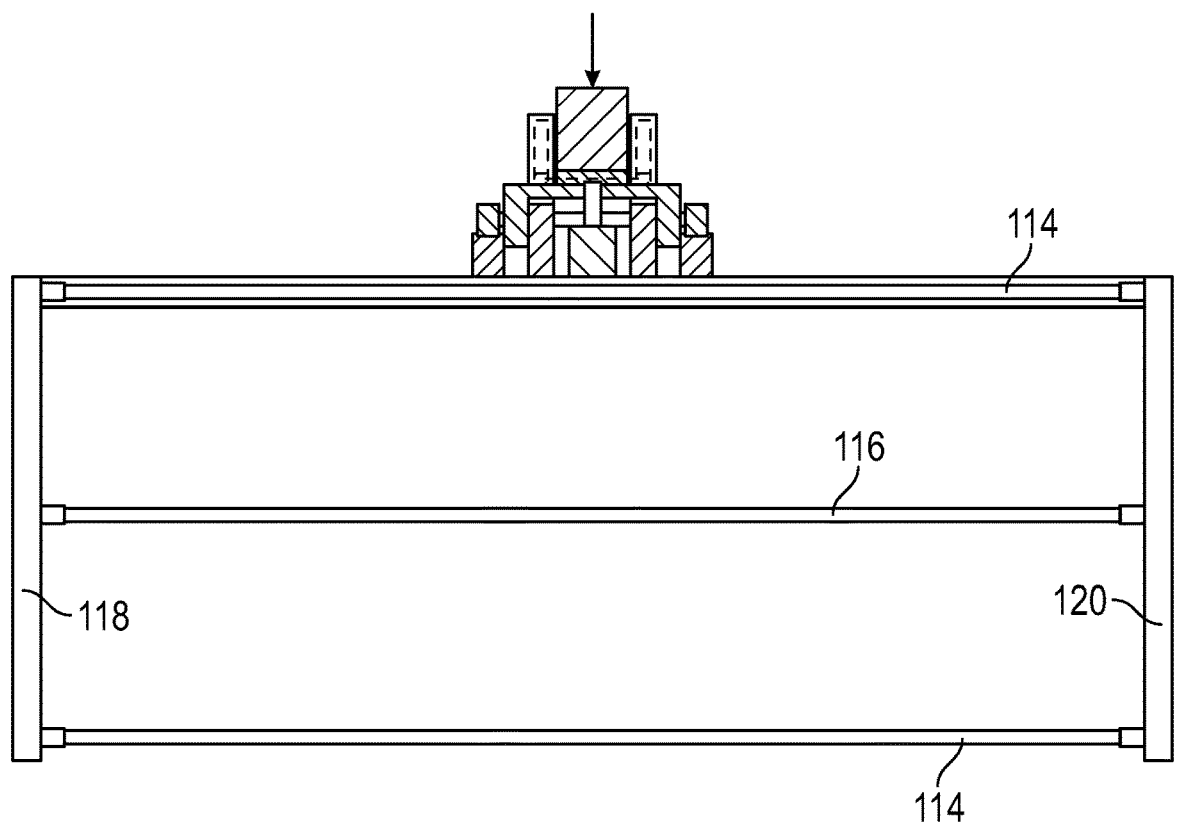
FIG. 18 is a rear view of a scissor lift in an extended position coupled to a landing pad rail.
Figure 19:
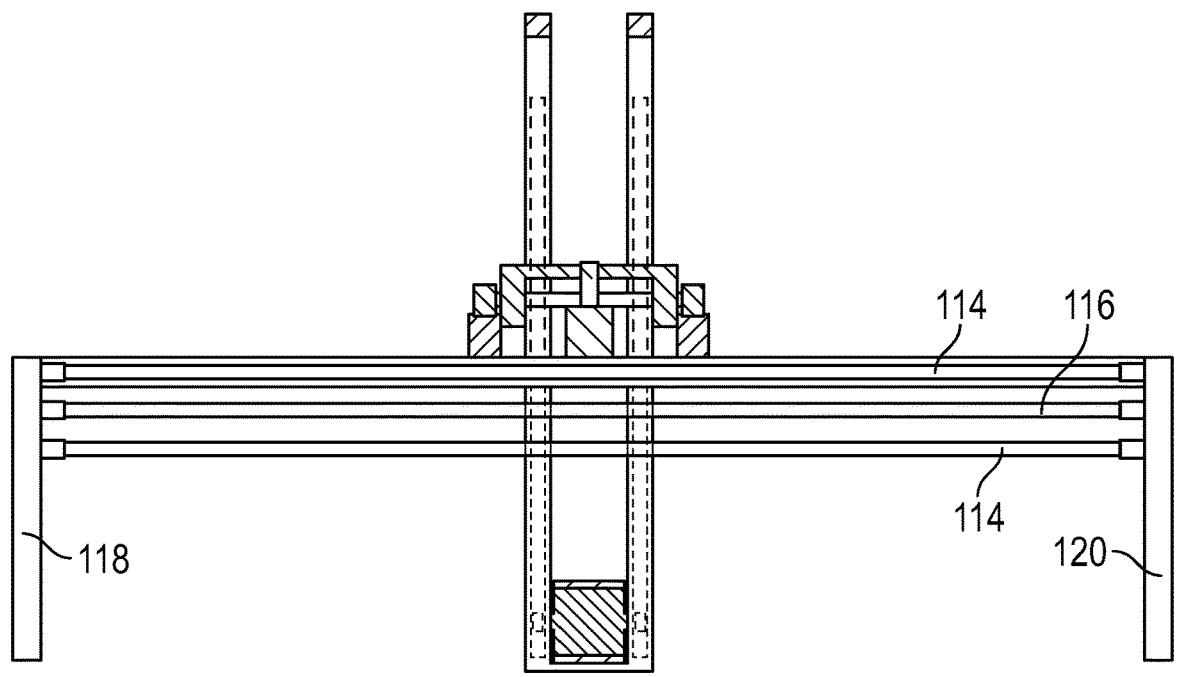
FIG. 19 is a rear view of the scissor lift of FIG. 18 in a retracted position.

Referring to FIG. 11, a side view of a set of scissor lift arms is illustrated. In various implementations, the scissor lift may include rear supports spanning between the two sets of scissor lift arms directly coupled to the rearward most points 106 of the intersecting arms 108. In various implementations, the scissor lift may include middle supports spanning between the two sets of scissor lift arms directly coupled to the midpoints 110 of the intersecting arms 108. In various implementations, the scissor lift may include front supports spanning between the two sets of scissor lift arms directly coupled to the frontward most points 112 of the intersecting arms 108. In particular implementations, the scissor lift may include only the rear supports and the middle supports. In such implementations, the front supports may be excluded so as to not interfere with the package receptacle when the scissor lift is in a retracted position. The rear supports and middle supports are illustrated by FIGS. 18 and 19. Referring to FIG. 18, a rear view of a scissor lift in an extended position coupled to a landing pad rail is illustrated. Referring to FIG. 19, a rear view of the scissor lift of FIG. 18 in a retracted position is illustrated. As illustrated by FIGS. 18 and 19, rear supports 114 extend between a first set of scissor lift arms 118 and a second set of scissor lift arms 120. The middle support 116 is between the rear supports 114. While FIGS. 18 and 19 illustrate only 3 supports, it is understood that the scissor lift mechanism may include any number of rear supports, middle supports, and/or front supports. The number of supports may depend upon the number of scissor lift arms within the scissor lift.

Referring back to FIG. 11, in various implementations the scissor lift may include one or more extension springs 122 coupled between a rear portion of a set of scissor lift arms and a front portion of the same set of scissor lift arms. The extension springs 122 may be included in only a single set of scissor lift arms or multiple sets of scissor lift arms. In various implementations, a set of scissor lift arms may include a single extension spring, two extension springs, or more than 2 extension springs.

Figure 13:
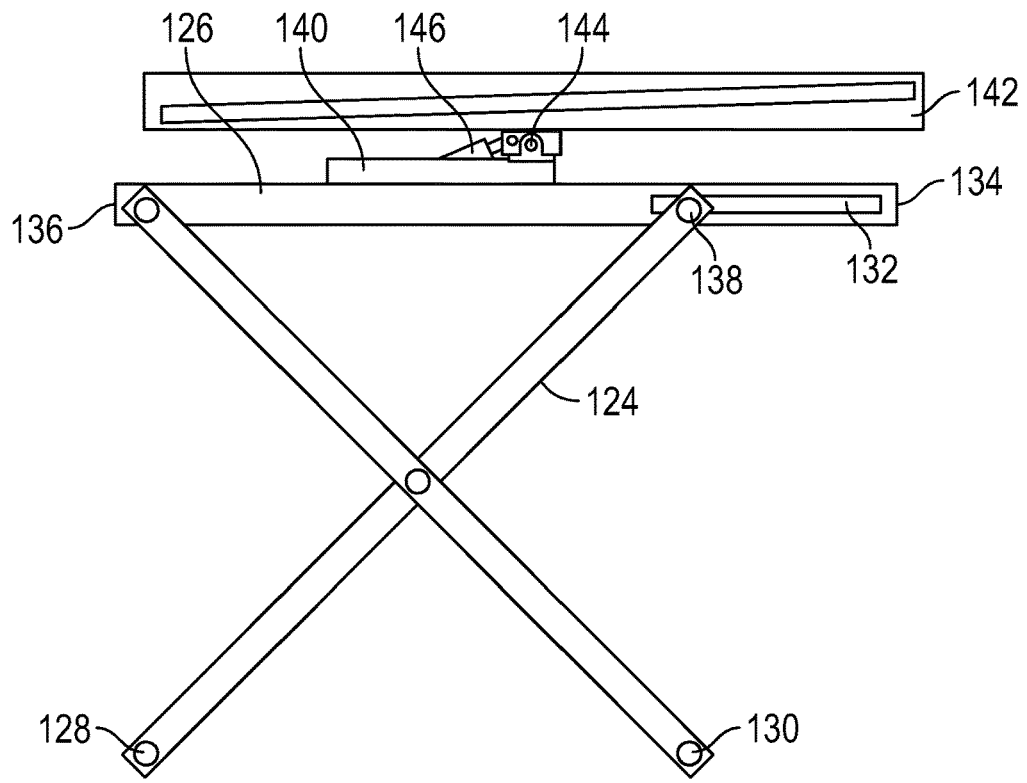
FIG. 13 is a side view of a scissor lift in an extended position coupled to a landing pad rail.
Figure 14:
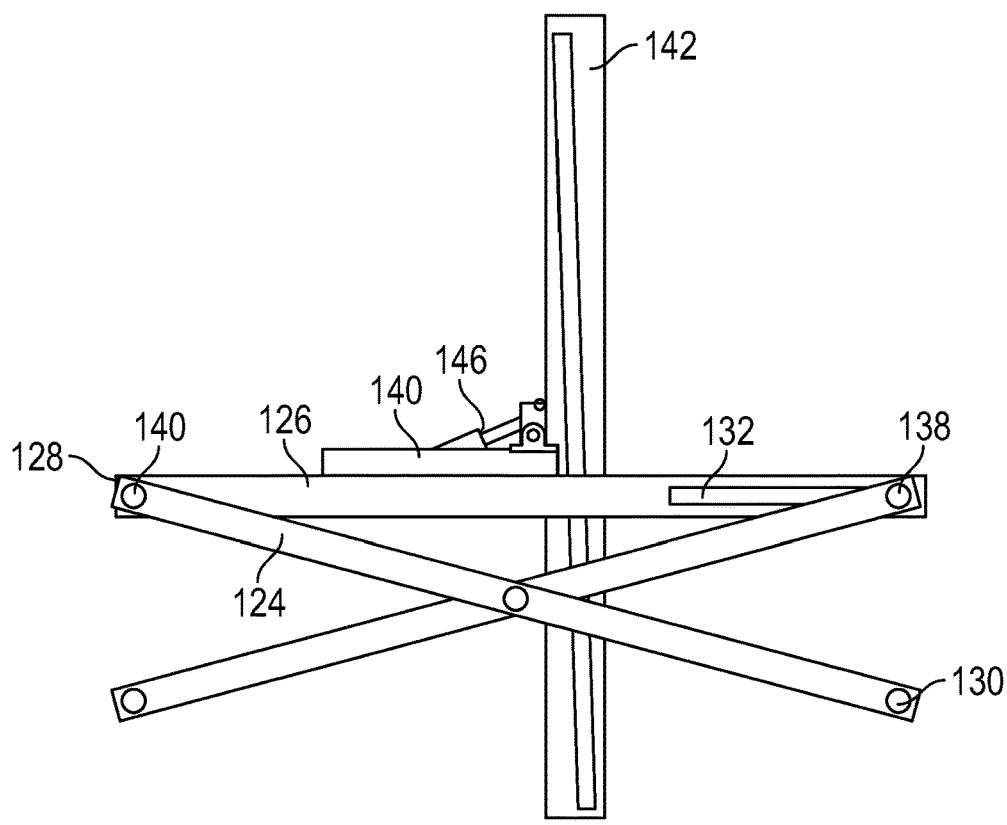
FIG. 14 is a side view of the scissor lift of FIG. 13 in a retracted position.

Referring to FIG. 13, a side view of a scissor lift in an extended position coupled to a landing pad rail is illustrated. Referring to FIG. 14, a side view of the scissor lift of FIG. 13 in a retracted position is illustrated. As illustrated by FIGS. 13 and 14, the scissor lift 124 (and any other scissor lift disclosed herein) may include a top brace 126 coupled between a rear 128 of the scissor lift and a front of the scissor lift 130. In implementations where the scissor lift includes multiple sets of scissor lift arms, each set of scissor lift arms may include a top brace the same as or similar to top brace 126. In various implementations, the top brace 126 may include a slot 132 extending through the top brace from a front portion 134 of the top brace 126 towards a rear portion 136 of the top brace 126. In various implementations, the slot 132 may only extend to the top brace 126 in a front half of the top brace 126. In various implementations, the upper and frontwards most arm 138 of the scissor lift arms may be slidably coupled to the slot 132. The slidable relationship between the upper and frontwards most arm 138 and the top brace 126 allows the scissor lift to extend upwards and retract downwards.

In various implementations, the scissor lift includes a landing pad coupling platform 140. The landing pad coupling platform 140 may be directly coupled over or between a first and second top brace of a first set of the scissor lift arms and a second set of scissor lift arms.

Still referring to FIGS. 13 and 14, a landing pad rail may be coupled to the landing pad coupling platform. The landing pad rail 143 of the drone landing pad system 2 is illustrated in FIGS. 4 and 5 and may be the same as any other landing pad rail and associated elements disclosed herein. Referring back to FIGS. 13 and 14, in various implementations, the landing pad rail 142 may be rotatably coupled to the landing pad coupling platform through a rail rotation device 144. In various implementations, the rail rotation device 144 allows the landing pad rail 142 to transition between a horizontal position (or a position substantially perpendicular to the direction of the lift of the extension mechanism) and a vertical position (or position substantially parallel to the direction of the lift of the extension mechanism). In such implementations, the landing pad rail 142, and in turn, the landing pad coupled to the landing pad rail, may be configured to rotate 90°. In such implementations, the drone landing pad system may include a linear actuator 146 coupled between the landing pad coupling platform 140 and the landing pad rail 142 configured to rotate the landing pad rail 142 about the rail rotation device 144. In various implementations, the drone landing pad system may include a spring between the landing pad platform 140 and the landing pad rail in order to facilitate rotation of the landing pad rail. The spring may be used in conjunction with the actuator. In other implementations, landing pad rail may be non-rotatably coupled to the landing pad coupling platform. In such implementations, the landing pad of the drone landing pad system may not be configured to rotate.

Figure 15:
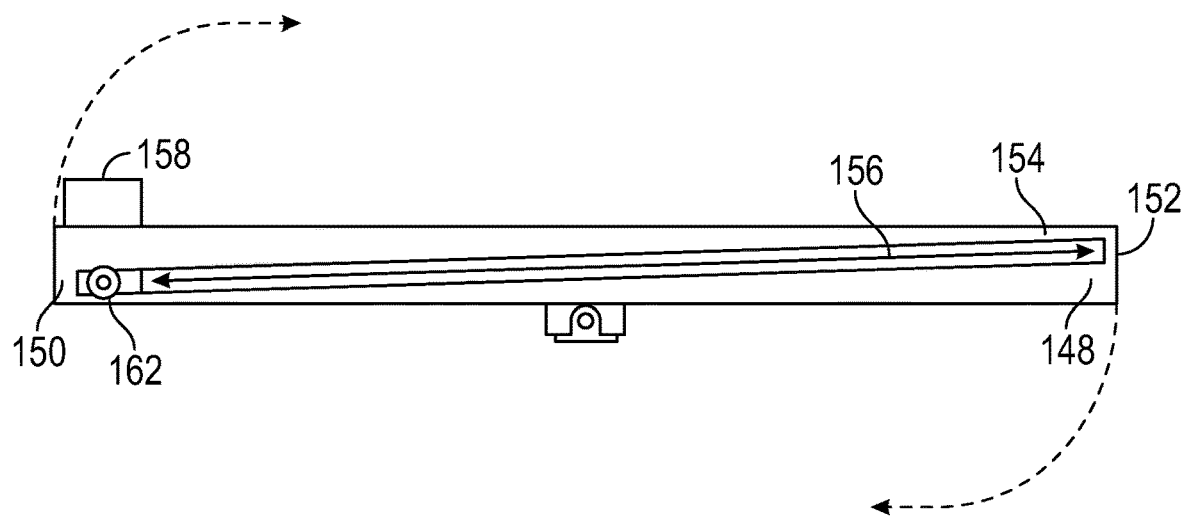
FIG. 15 is a side view of a landing pad rail in a horizontal orientation.
Figure 16:
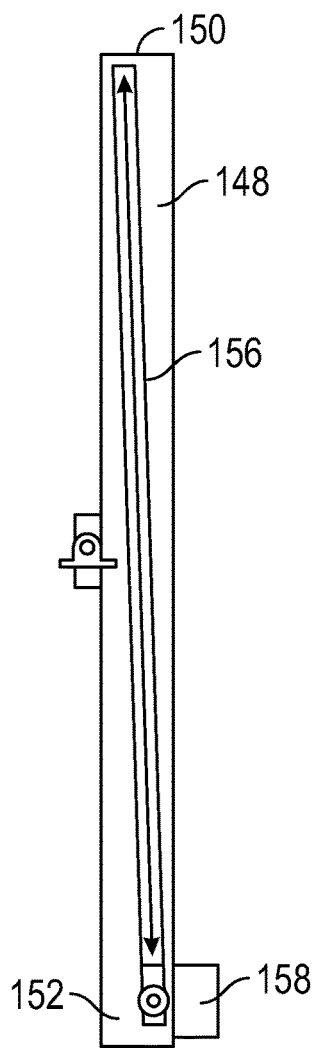
FIG. 16 is a side view illustration of a landing pad rail in a vertical orientation.
Figure 17:
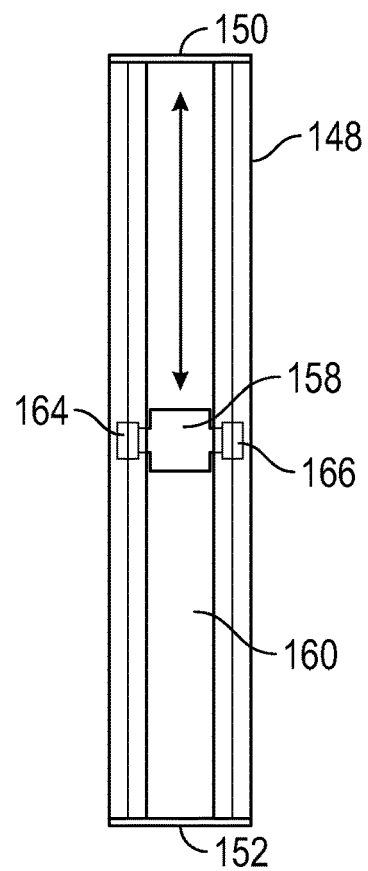
FIG. 17 is a top view of the landing pad rail of FIG. 15.

Referring to FIG. 15, a side view of the landing pad rail in a horizontal orientation is illustrated. Referring to FIG. 16, a side view illustration of the landing pad rail of FIG. 15 in a vertical orientation is illustrated. Referring to FIG. 17, a top view of the landing pad rail of FIG. 15 is illustrated. The landing pad rails and associated elements of FIGS. 15-17 may be the same as any other landing pad rail or associated element of any implementation of a drone landing pad system disclosed herein. As illustrated by FIGS. 15-16, the landing pad rail 148 may include a slot 156 extending from a first end portion 150 to a second end portion 152. In various implementations, and as illustrated by FIG. 15, the slot may extend from a bottom portion 162 of the rear portion 150 of the landing pad rail to an upper portion 154 of the front portion 152 of the landing pad rail when the landing pad rail is in a horizontal orientation, as illustrated by FIG. 15. Accordingly, the slot 156 within the landing pad rail may be angled relative to the landing pad rail 148.

Still referring to FIGS. 15-17, the drone landing pad system may include a landing pad attachment device 158 slidably coupled to the landing pad rail 148. In various implementations, the landing pad attachment device 158 may be configured to slide from the first end portion 150 of the landing pad rail 148 (as is illustrated by FIG. 15) to a middle of the landing pad rail (as is illustrated by FIG. 17) and to a second end portion 152 of the landing pad rail 148 (as is illustrated by FIG. 16). In various implementations, the movement of the landing pad attachment device 158 along the landing pad rail 148 may be restricted so as to not span the entire length of the landing pad rail. In particular implementations, and as illustrated by FIG. 17, the landing pad rail may include a second slot 160 that extends through the landing pad rail 148 from the upper portion 154 to the bottom portion 162. The slot 160 may be configured to receive the landing pad attachment device 158 therein. Further, slot 156 may also be configured to receive the landing pad attachment device 158 enabling the landing pad attachment device 158 to slide within the slot 156. In particular implementations, the landing pad attachment device may include a first wheel 164 and a second wheel 166 configured to fit and roll within the slot 156.

As illustrated by FIG. 15, when the landing pad rail is in the substantially horizontal position, or in an orientation substantially perpendicular to the direction the landing pad is lifted by the extension mechanism, the landing pad attachment device 158 may naturally slide within the slot 156 towards the first end portion 150 of the landing pad rail 148 as the end of the slot at the first end portion of the landing pad rail is lower than the end of the slot at the second end portion 152 of the landing pad rail. Referring to FIG. 16, when the landing pad rail is in a substantially vertical position, or in an orientation substantially parallel to the direction the landing pad is lifted by the extension mechanism, the landing pad attachment device 158 may naturally slide within the slot 156 towards the second end portion of the landing pad rail as the end of the slot at the second end portion 152 of the landing pad rail is lower than the end of the slot at the first end portion 150 of the landing pad rail. Inasmuch as the landing pad is configured to attach to the landing pad attachment device, the landing pad is configured to extend and move in the same direction as the landing pad attachment device 158 in relation to the landing pad rail 148.

While the current disclosure describes the landing pad rail slidably coupled to a landing pad via the landing pad attachment device 158 sliding within the slot 156, it is understood that other mechanisms and configurations may be used to enable the landing pad to move or slide in relation to the landing pad rail.

In implementations where the landing pad attachment device 158 and any landing pad attached the landing pad attachment device are configured to move along the landing pad rail as illustrated by FIGS. 15-17, the landing pad may be able to extend away from the extension mechanism configured to lift the landing pad in a substantially horizontal direction. In so doing, the landing pad may be moved away from the remainder of the drone landing pad system and may allow for more space for a drone to deliver a package on the landing pad. In various implementations where the drone landing pad system is next to a building or other structure, the ability of the landing pad to move horizontally away from the remainder of the drone landing pad system may also move the landing pad further away from the structure, thus allowing for more space for the drone to deliver a package to the landing pad.

In implementations of a drone landing pad system including a landing pad rail and landing pad configured to rotate, the landing pad may be configured to tilt to transfer a delivered package into the package receptacle, as is illustrated by FIG. 5.

In other implementations, the landing pad and landing pad attachment device may be fixedly coupled to the landing pad rail. In such implementations, the landing pad rail may still be configured to rotate along with the landing pad attachment device and landing pad, but the landing pad and landing pad attachment device would not slide along the landing pad rail. In such implementations, the landing pad attachment device may be coupled to either end, middle, or other portion of the landing pad rail. In other limitations, the landing pad may be directly coupled to a rotation device and the drone landing pad system may not include a rail landing pad. In still other implementations, the landing pad may be fixedly and non-rotatably coupled to a landing pad coupling platform. In such implementations, the landing pad may only be configured to extend in a single direction.

Referring back to FIGS. 3-5, the drone landing pad system 2 includes a landing pad 36 coupled to the extension mechanism 34. Referring to FIG. 4, a surface 188 of the landing pad configured to receive a package 190 may be substantially perpendicular to the direction the scissor lift raises the landing pad when the landing pad is in an elevated position. Referring to FIG. 5, the landing pad may be configured to tilt to deliver the package 190 into the package receptacle. After the package is delivered the landing pad may be configured to retract within the landing pad receptacle, as illustrated by FIG. 3. Referring to FIG. 3, the surface 188 of the landing pad may be substantially parallel to the direction the scissor lift raises the landing pad when the landing pad is in a retracted position.

Figure 20:
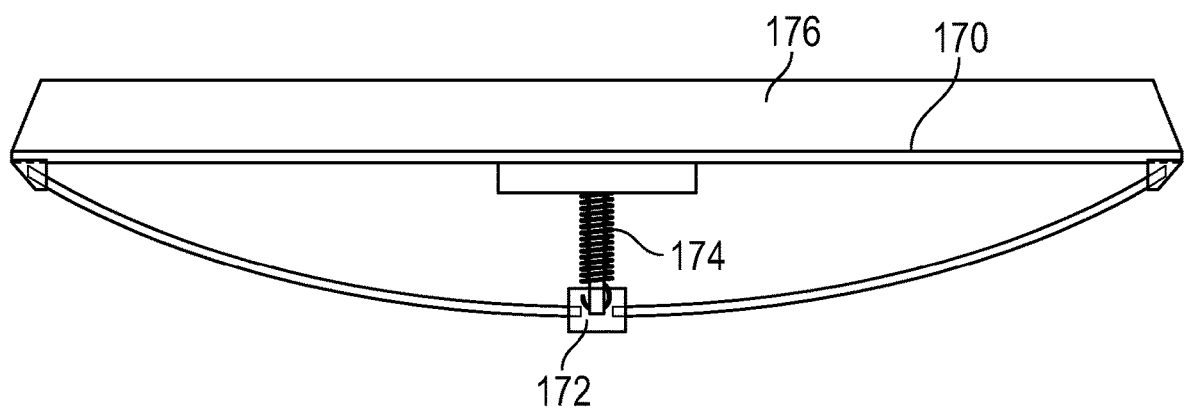
FIG. 20 is a side view of a landing pad including a strut.

Referring to FIG. 20, a side view of a landing pad is illustrated. In various implementations, the landing pad 170 may be coupled to a landing pad attachment device 172. The landing pad attachment device 172 may be the same as the landing pad attachment device 158 of FIGS. 15-17. In various implementations, the landing pad 170 may be coupled to the landing pad attachment device 172 through an extension spring 174. In various implementations, the landing pad may include one or more struts extending from an edge of the landing pad 170 to the landing pad attachment device 172. In other implementations, the landing pad does not include struts. The struts may add strength and stability to the landing pad while also acting as shock absorbers.

The landing pad 170 may include various shapes and/or sizes. In various implementations the landing pad may include a perimeter having the shape of, by non-limiting example, a triangle, a rectangle, a square, a circle, a hexagon, an octagon, a polygon, a pentagon, or any other shape. The landing pad may be made from metal, plastic, carbon fiber, fiber glass, any other rigid material, or any combination thereof.

In various implementations, the landing pad 170 may be partially collapsible. In such implementations, the landing pad 170 may be configured to expand when it is deployed above a landing pad receptacle. In such implementations, the area of the landing pad may be increased to provide a larger surface area for a drone to land on. The landing pad 170 may be configured to partially collapse prior to retracting back into the landing pad receptacle. In various implementations, the landing pad may include visual landing indications and/or guided landing protocols required by a particular drone and/or delivery service. The landing pad may comply with all Federal Aviation Administration (FAA) guidelines for drone landing pad design and specifications.

Figure 21:
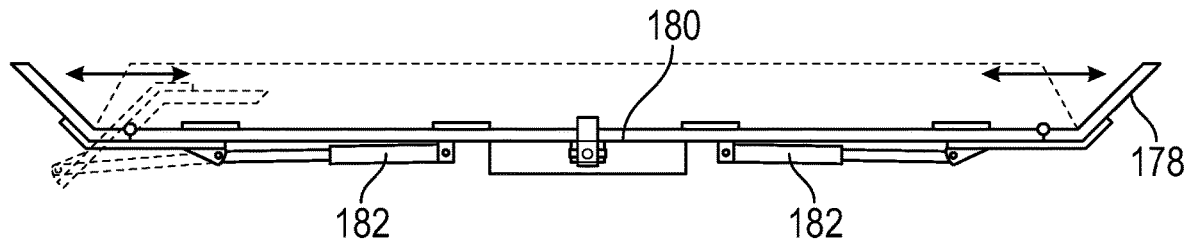
FIG. 21 is another side view of a landing pad.
Figure 22:
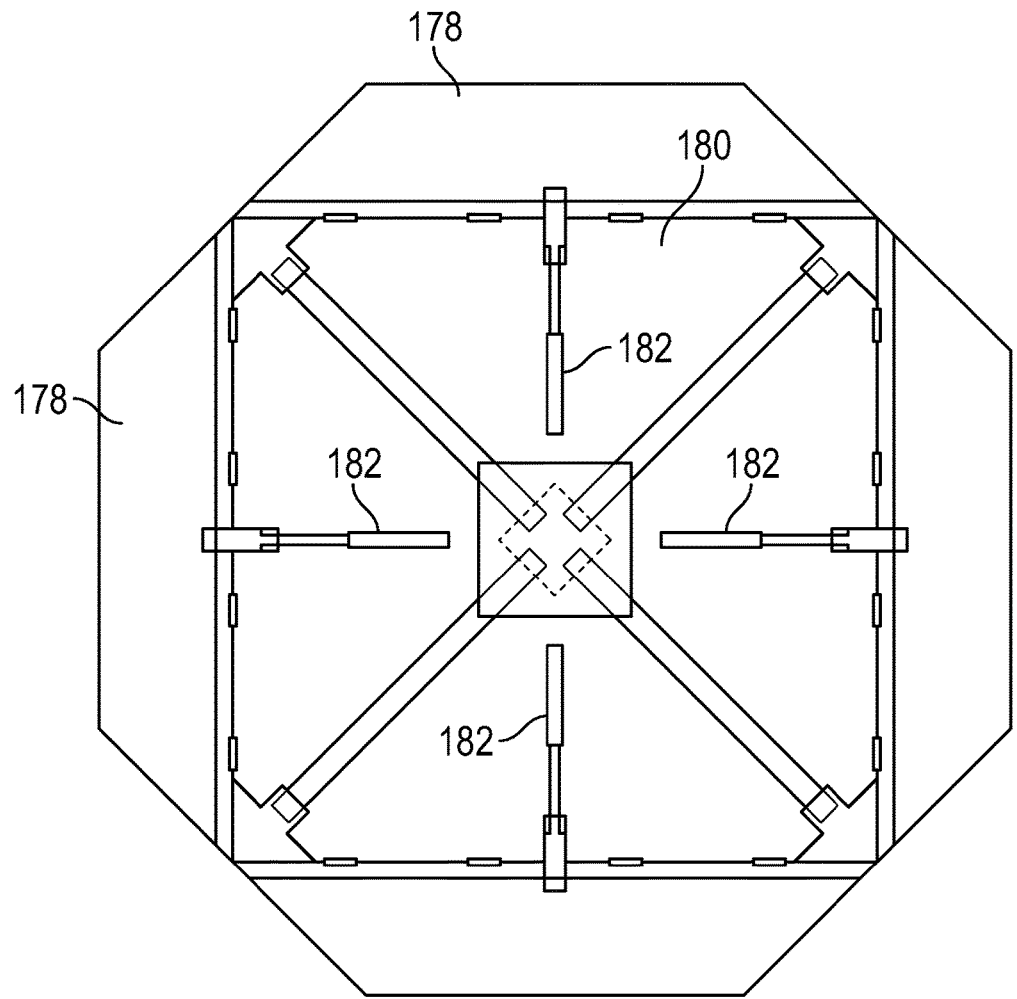
FIG. 22 is a bottom view of the landing pad of FIG. 21 with struts.

In various implementations, the landing pad 170 may include one or more flaps 176. Referring to FIG. 21, another side view of a landing pad is illustrated. Referring to FIG. 22, a bottom view of a landing pad of FIG. 21 with struts is illustrated. The flaps and associated elements of FIGS. 21 and 22 may be the same as any other flaps or associated elements of any other drone landing pad systems disclosed herein. As illustrated by FIGS. 21 and 22, the flaps 178 of the landing pad 180 may be configured to fold away from a center of the landing pad when the landing pad is in an elevated position. In other implementations, the flaps may not be configured to move in relation to the remainder of the landing pad but may be fixed to the landing pad. In implementations where the flaps are configured to fold away, the landing pad may include one or more actuators 182 configured to fold the flaps away from the center and/or towards the center of the landing pad. In such implementations, the drone landing pad system may also include one or more motors configured to fold the flaps in a power source coupled to the one or more motors. The power source may include a battery which may be the same as or separate from any of the battery disclosed herein. In various implementations, the landing pad may include one or more springs used to facilitate the folding of the flaps. The one or more springs may be used in conjunction with the one or more actuators 182.

In various implementations, the flaps 178 may serve as thrust vectoring mechanisms. The flaps are sloped upwards and extend out from the center of the landing pad. The downward thrust from propellers of the drone may be redirected and pushed upwards, thereby not disturbing the air or the ground beneath the landing pad. In various implementations, the flaps 178 may include slits therein to deflect airflow from the drone away from the pad. In such implementations, the slits will also serve as relief for wind which allows for more stability in windy environments.

In various implementations, the system may be configured to be placed or installed on, by non-limiting example, a yard, deck, porch, rooftop, patio, balcony, window, wall of a building, or any other place capable of receiving the system.

In various implementations, any implementation of a drone landing pad system disclosed herein may be assigned a unique serial number, a unique visual ID, and/or a unique electronic ID associated with the location of the drone landing pad system and the user of the drone landing pad system. In various implementations, the serial number and/or ID may be communicated to delivery service providers. Accordingly, when a user places an order, the delivery service may know where the package is to be delivered based upon the unique serial number and/or ID.

In various implementations, when a drone is within the range of the drone landing pad system, either the drone landing pad system may be configured to receive a signal from the drone, transmit a signal to the drone, or both receive and transmit a signal to/from the drone. The reception or transmission of the signal may initiate a handshake between the drone and the drone landing pad system. Because the serial number and/or ID assigned to the system is unique, the drone will know the serial number and/or ID and use the serial number and/or ID to establish communication with the drone landing pad system. In various implementations, a unique password may or may not be used in this communication.

In various implementations, the drone landing pad system may be configured to deploy the landing pad upon establishing the handshake with the drone.

In various implementations, the drone landing pad system may be configured to communicate the make model, and/or other parameters of the particular drone landing pad system to the drone. In such implementations, the drone may take into account this information in delivering the package to the drone landing pad system. Further, in various implementations, the drone landing pad system may be configured to communicate weather information to the drone. Such information may include, by non-limiting example, temperature, barometric pressure, wind speeds, or any other piece of weather-related information. The drone may then be configured to utilize this information or disregard this information when delivering the package to the drone landing pad system. In such implementations, the drone landing pad system may include instrumentation to acquire such weather-related information.

In various implementations, the drone landing pad system may be configured to transmit a "hold" signal to the drone. In response to receiving this "hold" signal from the drone landing pad system, the drone may be configured to hold its location while the drone landing pad system deploys and prepares for landing and/or delivery of the package. In various implementations, the drone landing pad system may be configured to transmit a "deliver" signal to the drone when the drone landing pad system is deployed and ready to receive either the drone and/or its package. Upon receiving the "deliver" signal, the drone may land and/or deliver a package. In various implementations, the drone landing pad system may be configured to detect multiple drones attempting to make multiple deliveries. In such an implementation, the drone landing pad system may communicate a "hold" signal to a first drone until the second drone has completed the delivery, after which the drone landing pad system may communicate a "deliver" signal to the second drone.

In various implementations, the drone landing pad system may be configured to receive a delivery protocol associated with the particular drone making the delivery. In turn, the system may be configured to adjust its configuration for that particular delivery protocol. Delivery protocols may include for example the drone physically landing on the system, the drone hovering over the system and lowering the package via a tether, the need to store the package in a climate controlled package receptacle, or any other piece of information.

The drone landing pad system utilizes technology that allows for the drone to determine the exact location of the system, thereby assuring a precise package delivery. In particular implementations, the drone may determine the exact location of the system through triangulation techniques.

In various implementations, after the drone delivers the package on the landing pad, the drone may depart from the drone landing pad system and send a disconnect signal to the drone landing pad system. Upon receiving the disconnect signal, the drone landing pad system may retract the landing pad into the landing pad receptacle and the package may be deposited into a package receptacle. In various implementations, the drone landing pad system may be configured to send an email, text, notification through a mobile application, or any other type of notification to the user indicating that a package has been delivered. In various implementations, the system may include mechanical safeguards to ensure that the package stays on the landing pad while the landing pad is retracted. In various implementations, the system may also be configured to transmit a signal to the delivery service provider indicating the package was delivered and that the drone has departed from the system.

In implementations having multiple package storage compartments, the drone landing pad system may transmit a signal to a recipient indicating which package storage compartment the delivered package is stored in. In such implementations, the drone landing pad system may also communicate a code to unlock a retrieval door of the corresponding package storage compartment housing the package. In this manner a single drone landing pad system may be utilized by multiple user's.

In various implementations, the system may be configured to receive a charge request from the drone. In such implementations, if the drone has insufficient battery charge to take the drone to its next location, the drone landing pad system may wirelessly charge a battery of the drone through a charger included in the drone landing pad system upon receiving the charge request from the drone. The charger may be included in any portion of the drone landing pad system. In such implementations, the system may include wirelessly charging technologies compatible with batteries utilized by the drone. In such implementations, the drone landing pad system may include mechanical safeguards configured to secure the drone to the drone landing pad system while charging the drone batteries. Upon the drone reaching an acceptable battery charge, the drone landing pad system may transmit a signal to the drone instructing the drone to depart from the drone landing pad system.

In various implementations, communication between the drone landing pad system and the drone may be made through radio signals, Bluetooth, internet protocols, or any other wireless telecommunication technology.

Any or all of the implementations disclosed herein may be compliant with any or all FAA regulations.

While the implementations disclosed herein primarily discuss communication between a drone landing pad system and a drone, it is understood that any of the implementations disclosed herein may communicate with multiple drones separately or simultaneously.

While the implementations disclosed herein primarily discuss communication between a drone and the system, it is understood that communication may also be established between the drone landing pad system and a non-drone delivery device, such as a user of the drone landing pad system and recipient of a package. In such implementations, when the user is within range of the drone landing pad system the drone landing pad system and a device on the user may establish a handshake based upon the unique serial number and/or ID assigned to the system. Upon establishing the handshake, the drone landing pad system may be configured to unlock a retrieval door allowing the user to retrieve a package from the system.

Any of the drone landing pad systems disclosed herein may be customized and programmed according to fit the needs of a particular user and their associated drone landing pad system. Such customizations may include customizing the speed of deployment and/or retraction of the landing pad, the height of the landing pad, the horizontal extension of the landing pad, or any other parameter of the drone landing pad system.

Implementations of the drone landing pad systems disclosed herein provide a user with the ability to do other things while a package is delivered inasmuch as the package will be safely stored in the drone delivery pad system until the user is ready to retrieve the package. Further, the implementations of the drone delivery pad systems disclosed herein may be placed at a location on the user's property picked by the user. This allows the user to control where packages are delivered.

While the implementations of the drone landing pad system disclosed herein largely discuss a system that automatically detects an arriving package, automatically raises a landing pad via a motor, retracts the landing pad via a motor, and transports a package into a secure package receptacle until it is received by the recipient of the package, other implementations may include only elements of the drone landing pad systems disclosed herein. For example, in various implementations the drone landing pad system may be manually operated. In such implementations, the landing pad will be manually raised via a lever or other mechanism coupled to the scissor lift or other extension mechanism. Upon delivery of the package onto the landing pad, the landing pad may be retracted via a manual retraction mechanism. In such implementations, the drone landing pad system may not include a package receptacle inasmuch as the recipient of the package who is operating the drone landing pad system is present to raise and retract the landing pad and may take the package the moment it is delivered. Such implementations may still include any elements disclosed herein that allows the drone landing pad system to communicate to the drone for the purpose of indicating a location of the drone landing pad system to the drone.

In places where the description above refers to particular implementations of drone landing pad systems and implementing components, sub-components, methods and sub-methods, it should be readily apparent that a number of modifications may be made without departing from the spirit thereof and that these implementations, implementing components, sub-components, methods and sub-methods may be applied to other drone landing pad systems.

What is claimed is:

1. A drone landing pad system comprising:
a body comprising a landing pad receptacle and a package receptacle coupled to the landing pad receptacle;
an extension mechanism coupled within the landing pad receptacle; and
a landing pad coupled to the extension mechanism and configured to couple within the landing pad receptacle;
wherein the extension mechanism is configured to lift the landing pad to an elevated position to receive a package from a drone;
wherein the landing pad is configured to tilt to transfer the package into the package receptacle; and
wherein a height of the drone landing pad system with the landing pad in the elevated position is greater than a height of the drone landing pad system with the landing pad coupled within the landing pad receptacle.

2. The drone landing pad system of claim 1, wherein the extension mechanism comprises a scissor lift.

3. The drone landing pad system of claim 1, wherein the package receptacle comprises a sloped back wall facing the extension mechanism.

4. The drone landing pad system of claim 1, wherein the package receptacle comprises three or more package storage compartments.

5. The drone landing pad system of claim 1, wherein the package receptacle comprises a divider configured to divide the package receptacle into a first package storage compartment and a second package storage compartment, wherein the divider is configured to reversibly extend across the package receptacle.

6. The drone landing pad system of claim 1, wherein the body further comprises a stabilizing section comprising a plurality of adjustable legs configured to level the drone landing pad system.

7. The drone landing pad system of claim 1, further comprising a landing pad receptacle lid coupled to the landing pad receptacle and a package receptacle lid coupled to the package receptacle.

8. A drone landing pad system comprising:
a body comprising a landing pad receptacle and a package receptacle coupled to the landing pad receptacle;
an extension mechanism coupled within the landing pad receptacle;
a landing pad coupled to the extension mechanism and configured to couple within the landing pad receptacle;
wherein the extension mechanism is configured to lift the landing pad to an elevated position to receive a package from a drone; and
wherein the landing pad is configured to slidably extend and move in a direction substantially perpendicular to the direction the landing pad is lifted by the extension mechanism after the landing pad is in the elevated position.

9. The drone landing pad system of claim 8, wherein the landing pad comprises a plurality of flaps configured to fold out and away from a center of the landing pad when the landing pad is in the elevated position.

10. The drone landing pad system of claim 8, wherein the landing pad is configured to slide along a landing pad rail in the direction substantially perpendicular to the direction the landing pad is lifted by the extension mechanism.

11. The drone landing pad system of claim 8, further comprising a divider configured to cover a package placed in the package receptacle, wherein the divider is configured to hold a second package placed in the package receptacle.

12. The drone landing pad system of claim 8, wherein the extension mechanism is a scissor lift.

13. The drone landing pad system of claim 8, wherein the package receptacle is climate controlled.

14. A drone landing pad system comprising:
a body comprising a landing pad receptacle and a package receptacle coupled to the landing pad receptacle;
a scissor lift coupled within the landing pad receptacle, the scissor lift comprising a first guide rail track and a second guide rail track;
a landing pad rail rotatably coupled to the scissor lift; and
a landing pad slidably coupled to the landing pad rail;
wherein the scissor lift is configured to lift the landing pad to an elevated position to receive a package from a drone;
wherein a surface of the landing pad configured to receive the package is substantially perpendicular to a direction the scissor lift raises the landing pad when the landing pad is in an elevated position;
wherein the landing pad is configured to retract within the landing pad receptacle; and
surface of the landing pad is substantially parallel to the direction the scissor lift raises the landing pad when the landing pad is in a retracted position.

15. The drone landing pad system of claim 14, wherein the landing pad rail is configured to rotate 90 degrees.

16. The drone landing pad system of claim 14, wherein the landing pad is configured to retract within the landing pad receptacle after the package is delivered from the drone.

17. The drone landing pad system of claim 14, wherein the landing pad is configured to be lifted by the scissor lift in a first direction and is configured to move along the landing pad rail in a second direction substantially perpendicular to the first direction.

18. The drone landing pad system of claim 14, further comprising a package receptacle lid coupled to the package receptacle and a landing pad receptacle lid coupled to the landing pad receptacle, wherein the scissor lift and the landing pad are configured to be completely enclosed by the drone landing pad system when the drone landing pad is in a retracted position.

19. The drone landing pad system of claim 14, wherein the scissor lift further comprises one or more extension springs coupled thereto.

* * * * *